US011274443B1

(12) United States Patent
Witt et al.

(10) Patent No.: US 11,274,443 B1
(45) Date of Patent: Mar. 15, 2022

(54) VEGETATED RETAINING WALL BLOCK APPARATUS AND METHOD

(71) Applicants: Carey Witt, Volente, TX (US); Greyson J Witt, Volente, TX (US)

(72) Inventors: Carey Witt, Volente, TX (US); Greyson J Witt, Volente, TX (US)

( * ) Notice: Subject to any disclaimer, the term of this patent is extended or adjusted under 35 U.S.C. 154(b) by 1079 days.

(21) Appl. No.: 15/830,432

(22) Filed: Dec. 4, 2017

(51) Int. Cl.
*A01G 9/02* (2018.01)
*E04C 1/39* (2006.01)
*E02D 29/02* (2006.01)

(52) U.S. Cl.
CPC ............. *E04C 1/39* (2013.01); *A01G 9/025* (2013.01); *E02D 29/025* (2013.01)

(58) Field of Classification Search
CPC .......... A01G 9/02; A01G 9/021; A01G 9/026; A01G 9/027; A01G 9/028; A01G 9/029
USPC .......... 47/65.5, 66.1, 66.3, 59 R, 73, 78, 84, 47/65.7, 65.8; 405/285
See application file for complete search history.

(56) References Cited

U.S. PATENT DOCUMENTS

| | | | | |
|---|---|---|---|---|
| 5,241,783 A * | 9/1993 | Krueger | ........... | A01G 9/026 47/65.8 |
| 5,675,933 A * | 10/1997 | Kawaguchi | ........... | A01G 9/029 47/65.8 |
| 6,016,628 A * | 1/2000 | Schlosser | ........... | A01G 9/029 47/65.8 |
| 6,681,521 B1 * | 1/2004 | Holloway | ........... | A01C 1/042 47/56 |
| 9,565,809 B2 * | 2/2017 | Zhang | ........... | C08J 11/04 |
| 2007/0163172 A1 * | 7/2007 | Savich | ........... | A01C 1/044 47/56 |
| 2007/0283621 A1 * | 12/2007 | Holloway | ........... | A01C 1/044 47/56 |
| 2012/0291346 A1 * | 11/2012 | Rose | ........... | A01C 1/04 47/57.6 |

FOREIGN PATENT DOCUMENTS

| | | | | |
|---|---|---|---|---|
| CN | 106703051 B | * | 5/2019 | ............. A01G 24/44 |
| FI | 62928 C | * | 12/1982 | ............ A01G 9/0293 |
| JP | 55119828 A | * | 9/1980 | ............... A01C 1/00 |

* cited by examiner

*Primary Examiner* — Peter M Poon
*Assistant Examiner* — Danielle A Clerkley
(74) *Attorney, Agent, or Firm* — Rick B. Yeager

(57) ABSTRACT

A stackable growth media filled porous fabric block-shaped container includes either an internal seed carrier to facilitate the growth of various plants from within the block, or an outer three-dimensional open structure media retention sleeve to support external growth of vegetation via hydro-mulching into the sleeve. A plurality of the containers may be stacked or laid side by side to create a vegetated retaining wall or a vegetated slope facing. The porous fabric block-shaped containers are filled with growth medium that encourages plant growth, while allowing proper drainage and moisture retention. The seed carrier is a degradable or porous material coated with or supporting seeds and other amendments which facilitate plant growth. The open structure media retention sleeve includes loops of filaments to increase friction between blocks and to hold hydromulch on exposed surfaces.

31 Claims, 21 Drawing Sheets

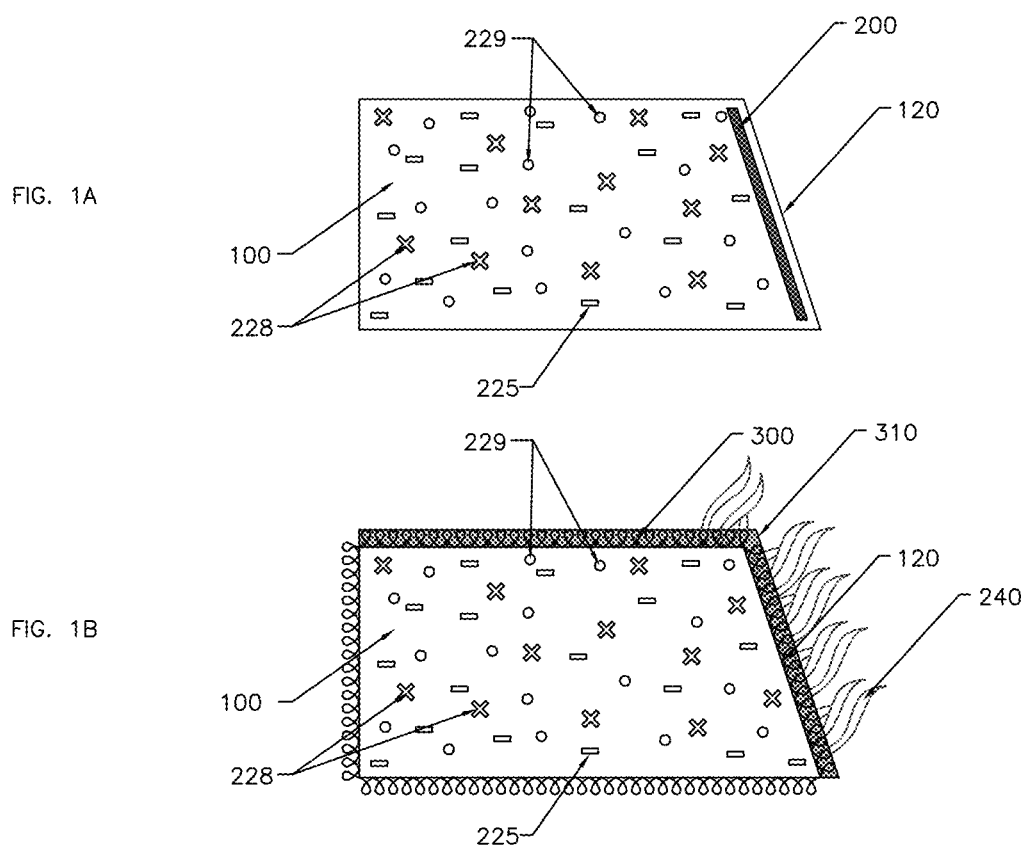
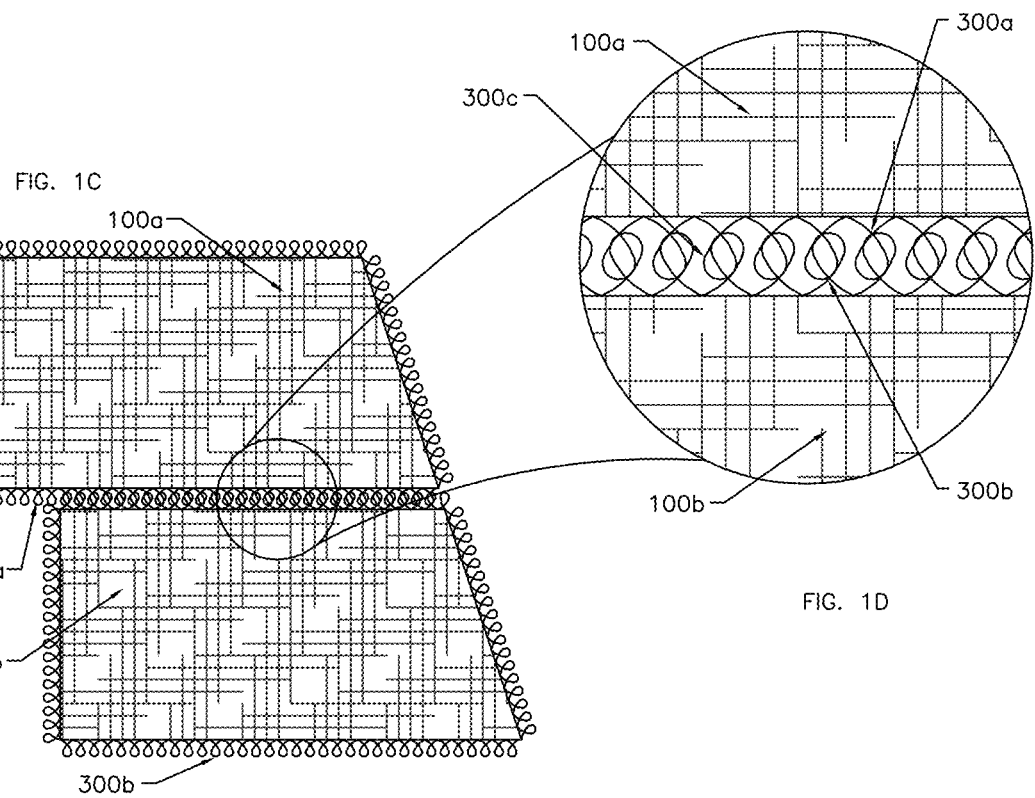

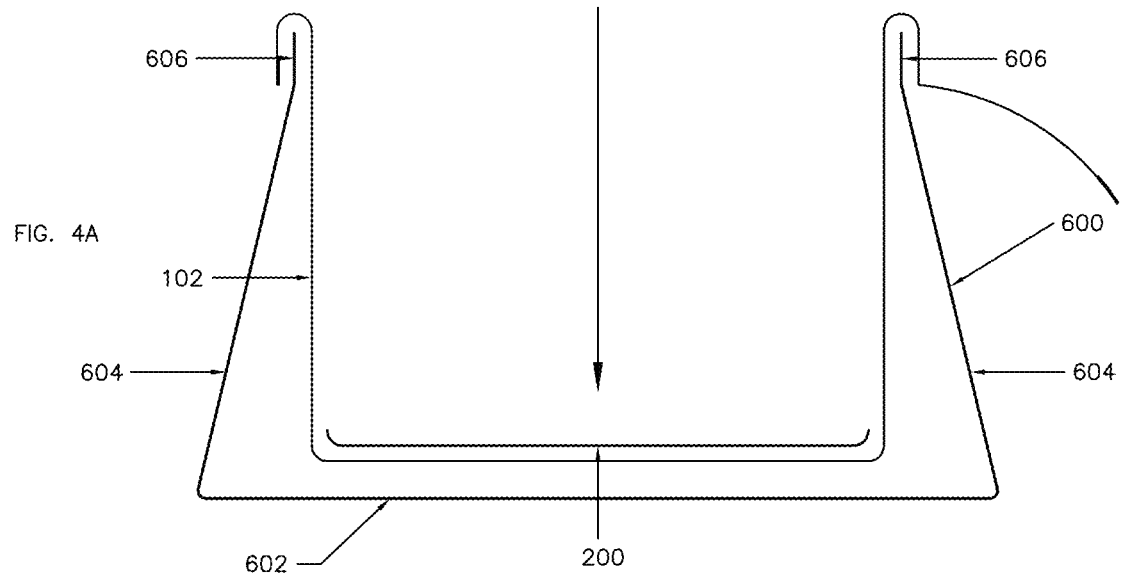
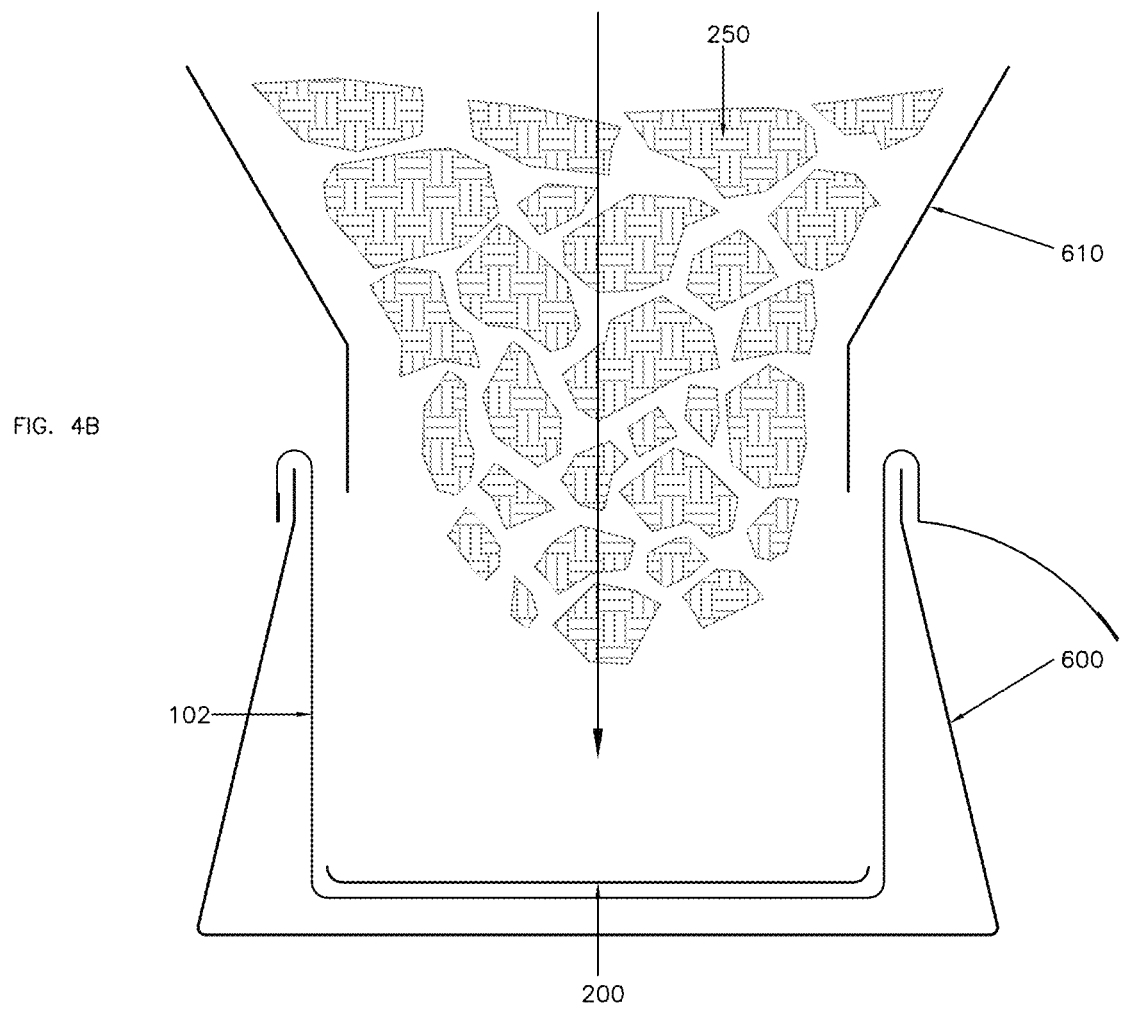

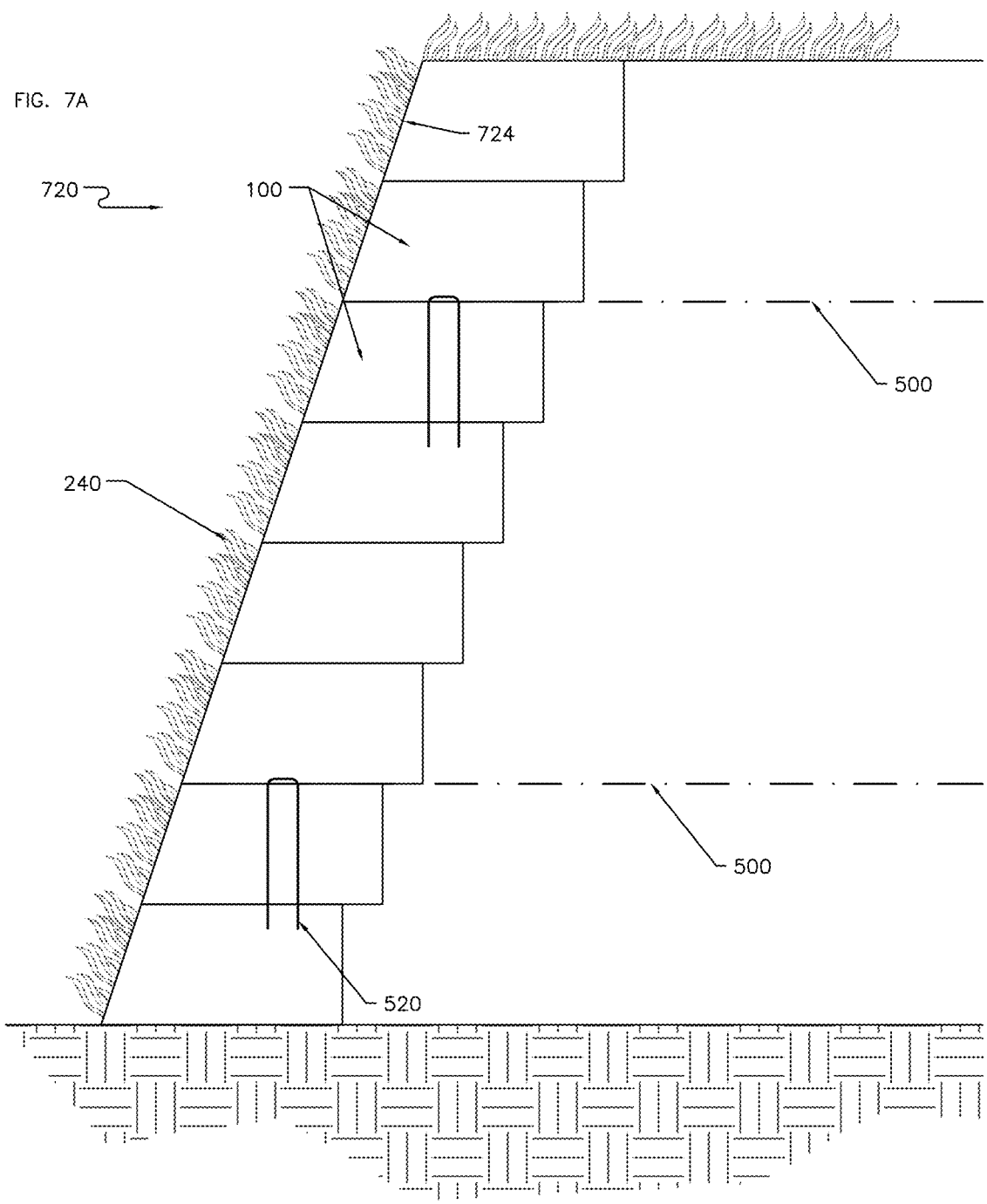

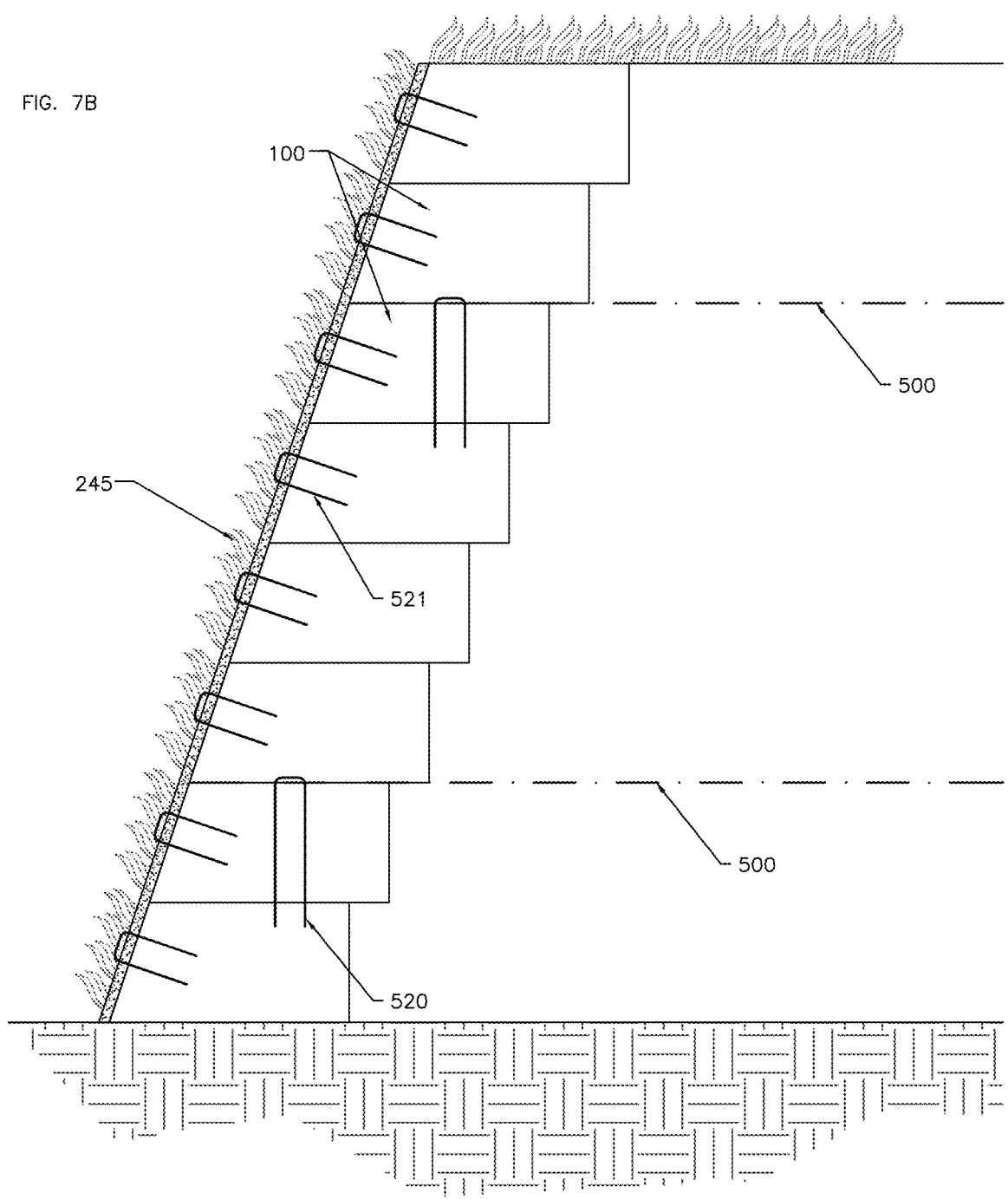

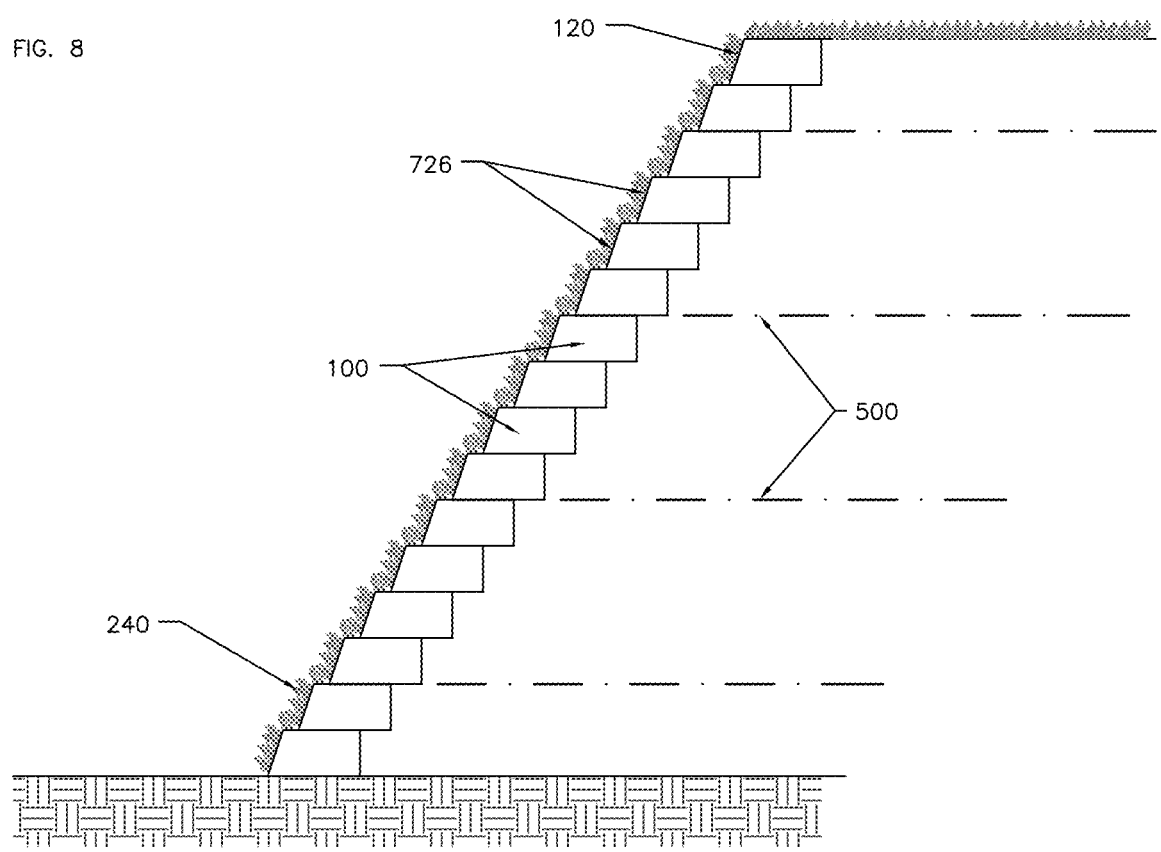

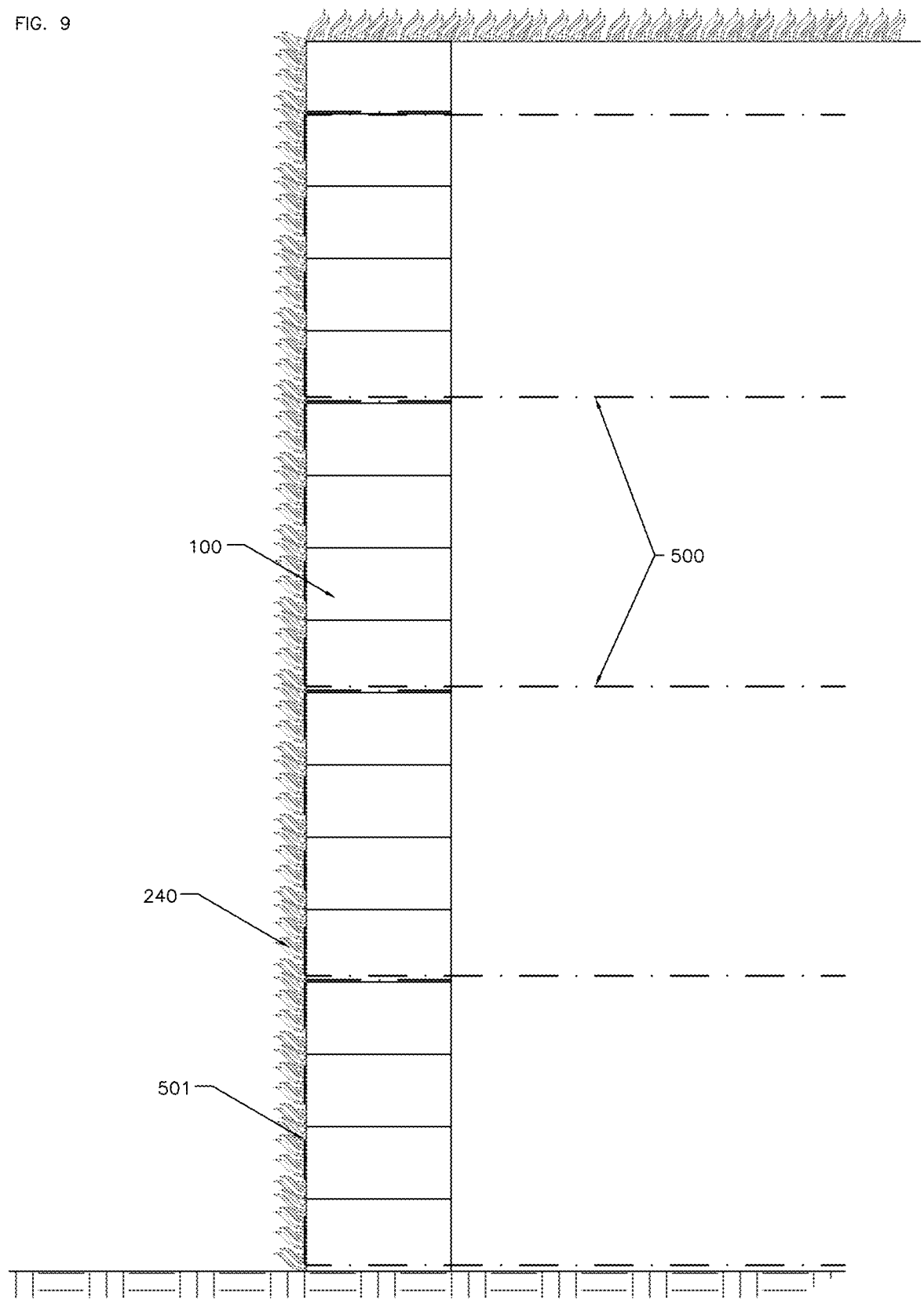

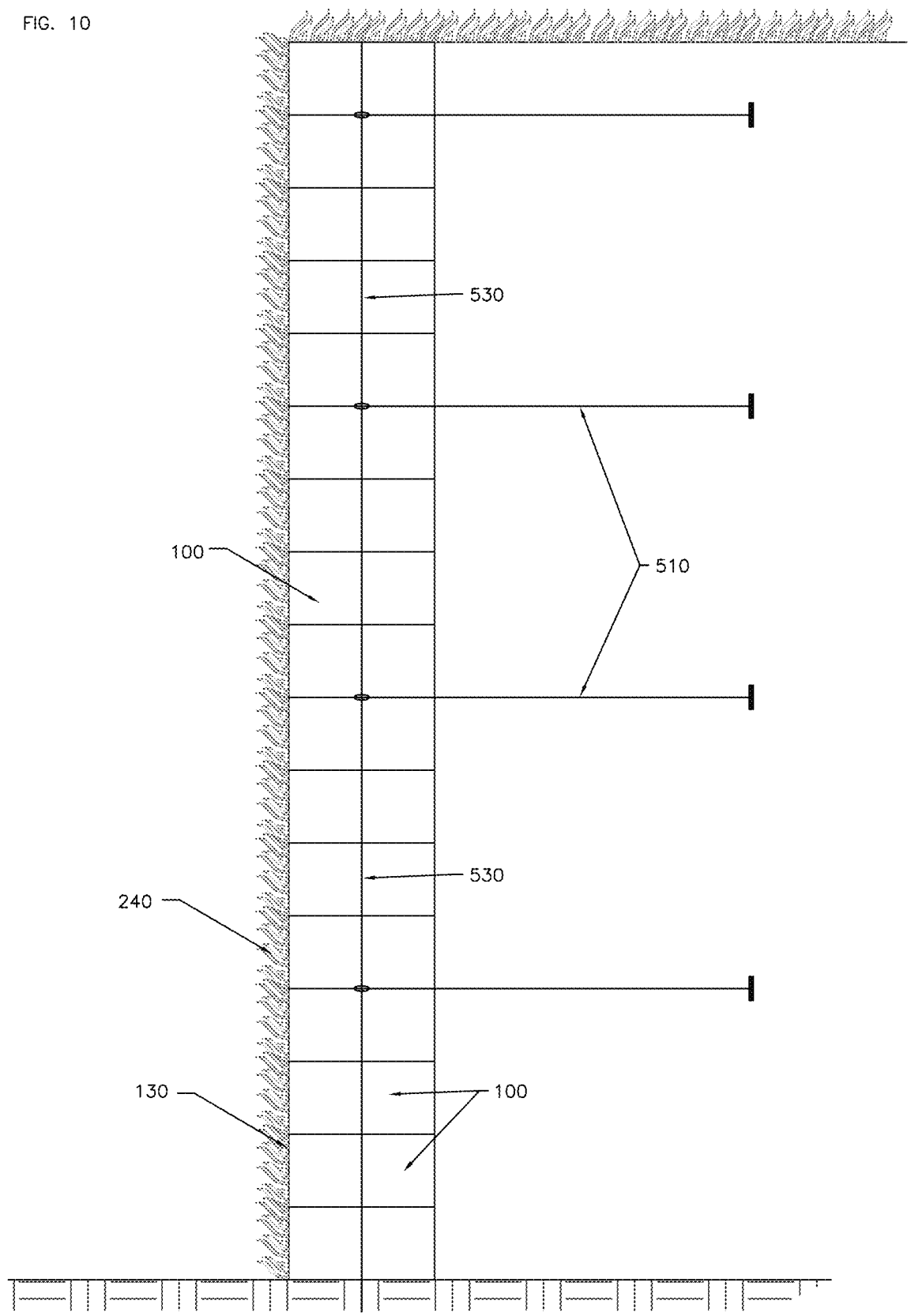

VEGETATED RETAINING WALL BLOCK APPARATUS AND METHOD

BACKGROUND

Field of Invention

A stackable growth media filled porous fabric block-shaped container includes either an internal seed carrier to facilitate the growth of various plants from within the block, or an outer three dimensional open structure media retention sleeve to support external growth of vegetation via hydro-mulching to create a vegetated retaining wall or slope facing.

Prior Art

There is a trend in the construction industry to utilize eco-friendly solutions as alternatives to conventional solutions. The use of green or living walls as an alternate to conventional stacked concrete block retaining walls is one such example. There are a number of available systems to address this desired result of creating a vegetated retaining wall. Below are the common vegetated retaining wall systems.

Vegetated Structures

The most common system comprises non-woven geotextile bags filled with soil that utilizes plastic spiked plates to interlock the system. This and similar systems rely on the ability to establish vegetation by planting the exterior of the bag and relying upon the roots to penetrate a geotextile bag exterior with limited porosity, typically less than 8% open area, or by planting between the bag courses.

This limitation has proven to make dense sustainable vegetation difficult to achieve.

Another technique to create vegetated structures is to build a series of soil lifts using outer wraps of geotextiles or erosion blankets to encapsulate the soil and upon which to establish vegetation. This technique is also difficult to vegetate and to construct.

Another system utilizes open-celled precast concrete or plastic modules that can be stacked to create planting pockets where vegetation is established.

Another system utilizes tubular socks manufactured from a mesh that is soil filled, stacked and vegetated.

The currently available solutions to creating a sustainable vegetated retaining wall are only marginally successful due to difficulties that include: construction difficulty, costly to build, costly to maintain, difficulty in creating and maintaining preferred geometry and difficulty in establishment and maintenance of dense vegetation.

As illustrated in FIG. 14 (PRIOR ART), US Patent Publication US 2011-0110728 by Kim describes a method for constructing an environmentally-friendly retaining wall using a soil bag for vegetation and fixing members and an installation structure thereof, in which the retaining wall is constructed by staggering soil bag blocks filled with regular amounts of soil. In detail, the upper and lower soil bag blocks are firmly fixed into a single body by a plurality of fixing members of a predetermined shape, a geogrid sheet of a predetermined length is set up and firmly fixed to the fixing members to form a retaining wall, a core net is installed on the surface of the retaining wall, soil and seeds of plants to be vegetated are mixed, and the mixture is placed so that the seeds can be actively germinated and the surface of the retaining wall can be fully afforested, thus not only enabling easy storage, transportation and installation of materials for the construction of the retaining wall, improving work efficiency and workability, and shortening the working time and reducing the economic burden of a constructor, but also improving the firmness and stability of the retaining wall by connecting and fixing a plurality of soil bag blocks into a single body through the fixing members, improving the germination of seeds, enabling the roots of germinated plants to be easily struck into the soil bag blocks, and thus providing perfect areas of greenery on the surface of the retaining wall.

As illustrated in FIG. 15 (PRIOR ART), U.S. Pat. No. 8,230,643 to Chang describes a slope planting structure which includes containing bags laid on the surface of a slope, stuffing filled in the containing bags, and fasteners. The containing bags are provided with plant seeds. The stuffing composed of plant growing material and absorbent material is filled into the containing bags. The containing bags are laid on the surface of the slope, and then the fasteners are inserted through the containing bags to secure the containing bags on the slope. The containing bags are integrated with the slope to secure the slope, providing protection and green effects. In various embodiments, Chang describes mixing seeds with bag fill material; sprinkling seeds on the surface of the containing bags; and sprinkling seeds between two adjacent containing bags.

US Patent Publication US 2014-0190076 by Weinzapfel describes a vegetation growth bag comprising a casing, where the casing is made from a biodegradable material such as burlap or hessian; a mixture of organic matter within the casing; where the mixture of organic matter includes a plurality of plant seeds, where as the plant seeds grow they erupt through the casing; and a pair of closures at each end of the casing; where the pair of closures prevent the mixture of organic matter from spilling from the casing. During use the vegetation growth bags are arranged along a barren land area, and left to allow rain and sunlight to promote growth of the seeds within the casing. Eventually the vegetation growth bags incorporate themselves into the barren land area by allowing the roots to anchor the casing to the ground. FIG. 16 (PRIOR ART) shows a plurality of bags of this type stacked to reinforce a bank.

As illustrated in FIG. 17 (PRIOR ART), U.S. Pat. No. 5,421,123 to Sakate et al describes The laying of a vegetation mat in close contact with a clad surface. The vegetation mat has a net, which prevents freezing or flow-away of vegetation material without the need for stretching a separate net. The mat comprises a layer of vegetation material selected from the group consisting of soil improvement material, fertilizer, organic material, vegetation seeds and combinations thereof, a front and back sheet, which are capable of being at least partly decomposed and are coupled together to wrap the vegetation material. A net having a mesh size permitting the budding and growth of the vegetation seeds, is provided on the front surface of the front sheet.

Open structure mesh materials may be used to cover reinforced slopes and provide a surface to hold soil to enable root systems to grow. The open structures can hold dirt or a hydroseeding substrate. An example mat material is Enkamat™ which is a three-dimensional polyamide mat with an open structure.

SUMMARY OF INVENTION

In one embodiment, highly porous fabric block-shaped containers are filled with a growth media to create block structures that are placed or stacked and vegetated to create a sustainable vegetated retaining wall or slope facing.

Porous fabric block-shaped containers are formed from a specific size and pattern of porous fabric with an arrangement of front gussets and sewn front edge and side seams with an open back that can be closed, once the fabric container is filled with a pre-determined volume of growth media, with a series of folded flaps with hook and loop fasteners to create a uniform block shape.

In some examples, the fabric containers have a porosity of 20-50% and include openings which are large enough to permit plant growth through exposed front or top block faces; and to permit root growth through the bottom or side faces of a block into adjacent blocks. The rapid root growth into adjacent blocks facilitates a natural interlocking of blocks, as well as healthy plant growth. This interlocking root growth can eliminate or reduce the need for pins to be placed through blocks to hold the blocks in place.

Providing the retaining wall blocks in the shape of uniform rectangular prisms permits a tight and attractive stacking of the blocks. The growth media filled fabric blocks can be placed or stacked in a variety of geometric arrangements ranging from a slope facing to a near vertical retaining wall. In one example, the vertical or inclined exposed front faces can be stacked to form a uniform exposed wall surface which can be vegetated. Block uniformity is enhanced by incorporating superabsorbent polymers to the growth media in the blocks, so that when water is added, the growth media expands to tightly pack the blocks.

A plant growth promotion structure is used in combination with the retaining wall blocks in order to provide rapid and uniform plant growth. In one example, the plant growth promotion structure is a media retention sleeve which is installed over the block to provide a three dimensional open structure matrix as an outer covering that improves friction between stacked blocks and holds hydromulch on exposed surfaces to establish vegetation from the outside of the blocks.

In other examples, the plant growth promotion structure is a seed carrier that provides a uniform layer of seeds and soil amendments which is placed internal to the fabric container and in proximity to an exposed block surface. The seed carrier is a degradable water soluble material, such as a polyvinyl alcohol film, that holds seeds in place until the seeds are released by wetting the film at a desired time and thus dissolving the film, thereby allowing the seeds to germinate. The seed carrier may include a seed layer of one seed type or various combinations of multiple seed types. The seed layer may also include one or more soil amendments such as fertilizer, moisture retention agents, and natural or synthetic herbicide and pesticide agents. The seed carrier may be a polyvinyl alcohol film that serves as a substrate upon which to adhere the seeds and soil amendments to the film until the film is dissolved when water is applied. The seed carrier may be supplied as a single support layer, or with an additional polyvinyl alcohol film cover layer used to cover the seed layer. The seeds can be glued to the polyvinyl alcohol film with water soluble adhesive or by attaching the seeds to the naturally adherent surface of the wetted and partially dissolved polyvinyl alcohol film.

In some examples, the landscape blocks are created at a job site by filling gusseted block-shaped fabric containers with a growth media and providing a plant growth promotion structure. In other examples, the landscape blocks are filled with a growth media and seed carrier at a remote site and then delivered to a job site. In other examples, the landscape blocks are filled with a growth media and media retention sleeves are applied to the blocks before delivery. In other examples, plant growth is initiated before block installation.

FIG. 6A is a side view of a hanging support filling frame 600 and an empty fabric container 102. FIG. 6B is an end view of the hanging support filling frame and a block-shaped fabric container of FIG. 6A. In this example, the filling frame is a steel rod structure with a base 602, angled side walls 604, and a top frame 606.

These embodiments provide improvement over previous systems in the several ways:

The blocks can be simply and reliably vegetated with a variety of plants to create dense and sustainable vegetation on the retaining wall or slope faces.

The porous fabric exterior of the block, coupled with the ability to be vegetated from within the block via biodegradable water soluble seed carriers or externally via hydromulch sprayed into the open structure matrix of a media retention sleeve that is placed around the block, ensures that dense vegetation can be established and maintained.

The use of a hanging support filling frame and rear fabric container closure permits seed carriers with a uniform seed distribution, and optional soil amendments, to be placed in proximity to the exposed front or top face of the block in order to facilitate rapid and uniform plant growth on exposed surfaces.

The form of the growth media filled gusseted porous fabric block allows a consistent and preferred geometry for improved ease of installation, structural stability and vegetative establishment.

The porous fabric blocks allow the root systems of the plants to grow through the sides, bottom and back of the block and into adjacent blocks and surrounding soil to create a contiguously reinforced structure that is anchored to adjacent soil zones.

DESCRIPTION OF FIGURES

FIG. 1A is a cross section view of a porous fabric block-shaped container with seed carrier positioned on the inside of the front face of the fabric container and the rest of the fabric container filled with a growth media to create an inclined face block.

FIG. 1B is a cross section of a porous fabric growth media filled block wrapped in an open structure matrix sleeve that is filled with hydromulch on exposed top or front surfaces.

FIG. 1C. is a cross section of two growth media filled blocks with interlocking media retention sleeves.

FIG. 1D is a detailed cross section view of a portion of the interface between the two growth media filled blocks of FIG. 1C.

FIG. 4A is a side cross section view of a fabric container with seed carrier supported in an open position on a support filling frame.

FIG. 4B is a side cross section view of the fabric container of FIG. 4A being filled with a growth media.

FIG. 7A is a side cross section view of a retaining wall utilizing a geogrid reinforcement system connected with staples to a plurality of retaining wall blocks with an inclined front face.

FIG. 7B is a side cross section view of a retaining wall utilizing a geogrid reinforcement system connected with steel staples to blocks with an inclined front face, with sod placed on the inclined front face of the retaining wall.

FIG. 8 is a cross section view of a retaining wall utilizing a geogrid reinforcement system connected to retaining wall blocks with an inclined front face, where the blocks are set back to create a less inclined face than the face of FIG. 7B.

FIG. 9 is a cross section view of a vertical retaining wall utilizing a geogrid reinforcement system which wraps in front of a plurality of vertical faced retaining wall blocks.

FIG. 10 is a cross section view of a vertical retaining wall utilizing a percussion anchoring system connected to connecting rods that are driven vertically through stacked blocks with a vertical front face.

DETAILED DESCRIPTION

List of Elements

Figure 2A:
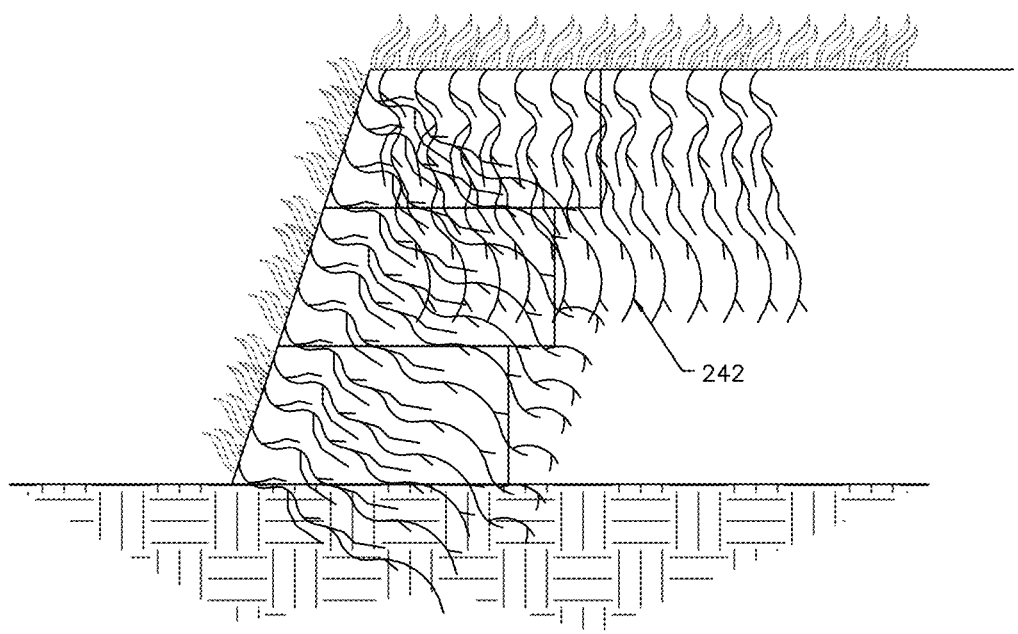
FIG. 2A. is a side cross section view of three blocks stacked in a configuration of an inclined face retaining wall. The blocks are fully vegetated and the root systems are growing through adjacent blocks and into adjacent soil zones.

The following element numbers are provided for convenience in reviewing the attached figures.
growth media filled gusseted fabric block 100
  upper growth media filled block 100a
  lower growth media filled block 100b
gusseted fabric block-shaped container 102
  front face 110
  inclined front face 120
  vertical front face 130
  top face 140
    rear edge of top face 142
    top face flap 144
      hook and loop fastener 146
  bottom face 150
    bottom face flap 154
      rear edge of bottom flap 155
      hook and loop fastener 156
  right side face 160
    rear edge 162
    right face flap 164
      right face flap extension 165
      hook and loop fastener 166 left side face 170
  left face flap 174
    rear edge of left flap 175
    hook and loop fastener 176
  bottom face short flap 177
  side flap connector strap 178
    hook and loop fastener 179a, 179b
rear face 180
  open rear face 181
  right top triangular fold 182
  right bottom triangular fold 183
  left top triangular fold 184
  left bottom triangular fold 185
  rear face top fold 186
  rear face bottom fold 187
seed carrier 200
  support layer 211
    top surface of support layer 212
    bottom surface of support layer 214
    polyvinyl alcohol support film 215
    wetted surface 216
  seed layer 220
    first seed type 222
    second seed type 224
  seed and agent layer 221
    perlite 225
    herbicide agent 226
    pesticide agent 227
    fertilizing agent 228
    moisture retention agent 229
  cover layer 230
    top surface of cover layer 231
    bottom surface of cover layer 232
    polyvinyl alcohol support film 235
vegetation layer 240
root systems 242
grass sod 245
growth media 250
media retention sleeve 300
  upper block media retention sleeve 300a
  lower block media retention sleeves 300b
  interlocking media retention sleeves 300c
  three dimensional open structure matrix material 302
  high friction layer 304
  edges 305, 306
  loops 307
  hydromulch 310
fold 400
  left face fold 410
  right face fold 420
  top face fold 430
  bottom face fold 440
sewn seam 450
geogrid sheet 500
  geogrid sheet wrapped in front of wall 501
percussion anchor 510
geogrid anchor 520
sod staple 521
connecting rod 530
hanging filling frame 600
  base 602
  angled side walls 604
  top frame 606
growth media hopper 610
block stack 700
  top layer of blocks 710
    exposed top layer 712
  retaining wall 720
    top surface 722
    inclined front surface 724
    setback front surface 726
porous fabric 740
  openings 742

Definitions

In this specification, the term "retaining wall" refers to a structure that is formed from one or more rows of growth media filled fabric containers that take the form of a block.

In this specification, the term "vegetated retaining wall" refers to a structure that is formed from one or more rows of blocks that are filled with a soil mixture to promote plant growth, and which have plants growing from exposed surfaces of the blocks.

In this specification, the terms "retaining wall block" and "landscape block" refer to a fabric container which is filled with a soil mixture, and has the shape of a rectangular prism with a generally flat top, bottom, front, and side faces. The front face is typically either vertical or inclined. The fabric container typically has a rear closure.

In this specification, the term "fabric" includes material produced by any combination of weaving, knitting, or otherwise processing textile fibers or synthetic polymers.

In this specification, the terms "gusset", "gusseted fabric block", "gusseted fabric block-shaped containers", and "gusseted porous fabric block" refers to sewn seams along the sides of the front face and bisecting the sides, where folds are provided in one or more of the front face, rear face, or side faces of the block to create a rectangular block shape, to reinforce the block, and to provide rectangular faces on the block. In some examples, no additional reinforcement element is provided, and the extra material in the folds provides stiffening and shapes the block. In other examples, a reinforcement element may be inserted before sewing the block, or prior to filling the block.

In this specification, the term "plant growth media" or "growth media" means dirt, mulch, compost, soil mixtures, or other organic material mixtures suited to support the growth of plants.

In this specification, the terms "fill material" or "soil mixture" means a plant growth media, or a mixture of plant growth media and one or more of organic or inorganic fillers or fertilizers.

In this specification, the term "seed carrier" means a degradable or porous material coated with or supporting seeds and other amendments which facilitate plant growth.

In this specification, the term "support layer" means the bottom layer of a one or two layer seed carrier system of polyvinyl alcohol films or porous materials.

In this specification, the term "seed layer" means a layer of plant seed.

In this specification, the term "cover layer" means a sheet, film or mat of organic or inorganic material which protects the plant seeds inside a retaining block until the desired time of growth.

In this specification, the term "hydromulching" means a method of hydraulic seeding involving a mixture of seed and mulch.

In this specification, the terms "block sleeve" or "media retention sleeve" mean an open structure matrix of fused fibers sewn into a sleeve shape which covers the exterior of the block.

A retaining wall block in the general shape of a rectangular prism may be provided with a vertical front face or an inclined front face. Stacking blocks with a vertical face provides a retaining wall with a vertical face, or with steps if the blocks are offset. Stacking blocks with an inclined front face can provide an inclined wall surface.

In this specification, the term "geogrid" means a planar geosynthetic material used to reinforce soils and similar materials. Geogrids are commonly used to reinforce the soils of mechanically stabilized earth retaining walls and slopes, as well as subbases or subsoils below roads or structures. Geogrids are strong tensile elements.

Gusseted Highly Porous Fabric Container or Block

Figure 12:
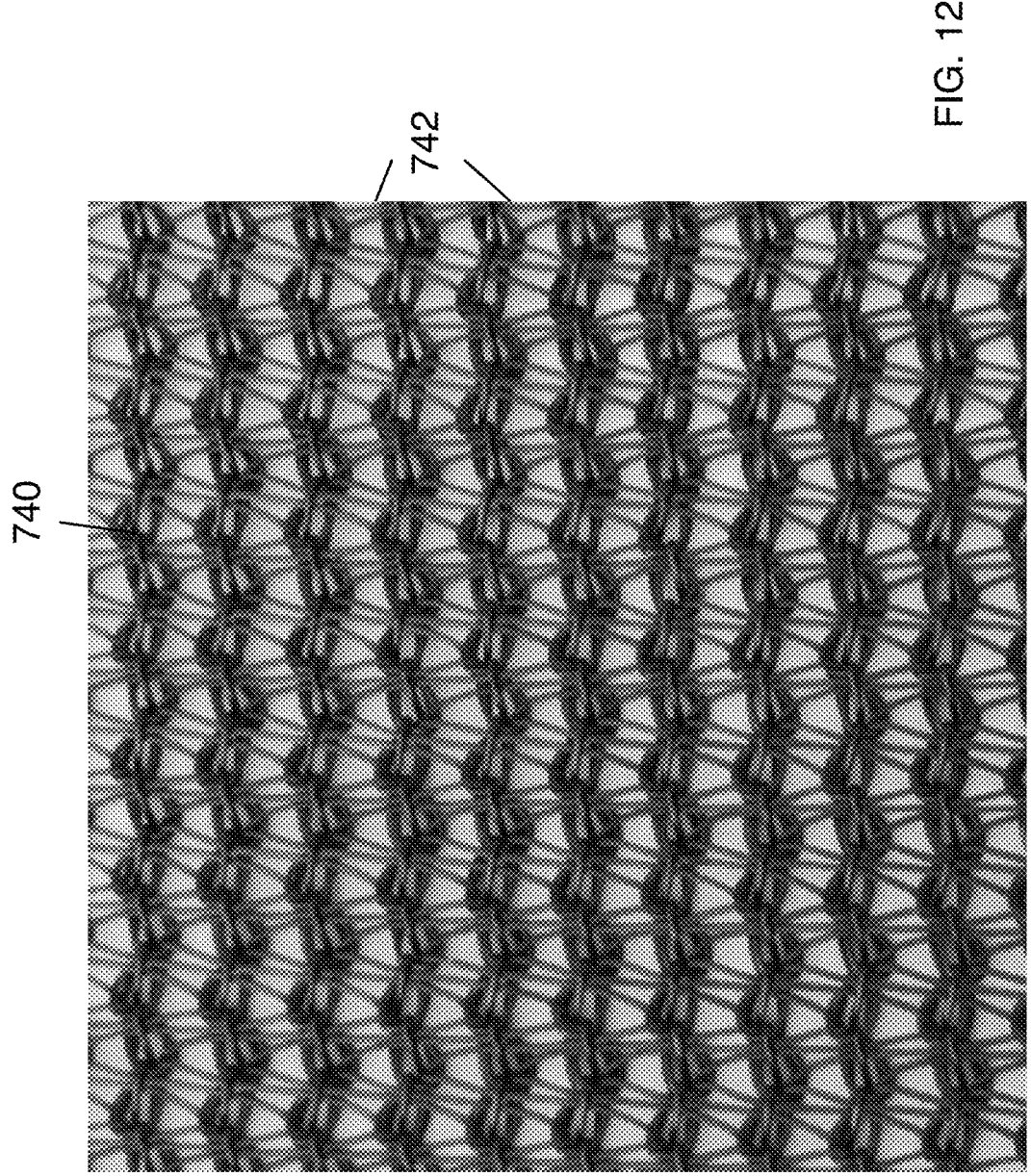
FIG. 12 is a top view of an example porous fabric.

FIG. 12 is a top view of an example highly porous fabric 740. This example is a knitted monofilament material that has an open area of approximately 30%. The fabric has many large openings 742 which permit plant stems or roots to easily grow through the material.

FIG. 1A is a cross section view of an example porous fabric block 100 with seed carrier 200 positioned on the inside of an inclined face 120 of the block, with the block filled with a growth media 250. In this example, the growth media includes perlite 225, a fertilizing agent 228, and a moisture retention agent 229.

FIG. 1B is a cross section of a porous fabric block 100 wrapped in a media retention sleeve 300 which forms an open structure matrix that is filled with hydromulch 310 on exposed top and front surfaces. In this example, seeds and initial growth media are provided in the hydromulch, and the hydromulch is retained in proximity to the exposed block surfaces. A vegetation layer 240 grows from the hydromulch.

FIG. 1C is a cross section of two growth media filled blocks, upper filled block 100a and lower filled block 100b with interlocking media retention sleeves 300b.

FIG. 1D is a detailed cross section view of a portion of the interface between the two growth media filled blocks, 100a and 100b of FIG. 1C. The upper block media retention sleeve, 300a interlocks with the lower block media retention sleeve, 300b to create the interlocking interface, 300c between the two blocks.

FIG. 2A is a side cross section view of three blocks 100 stacked in a configuration of an inclined face retaining wall. The blocks are fully vegetated and the root systems 242 are growing through adjacent blocks and into adjacent soil zones.

Figure 2B:
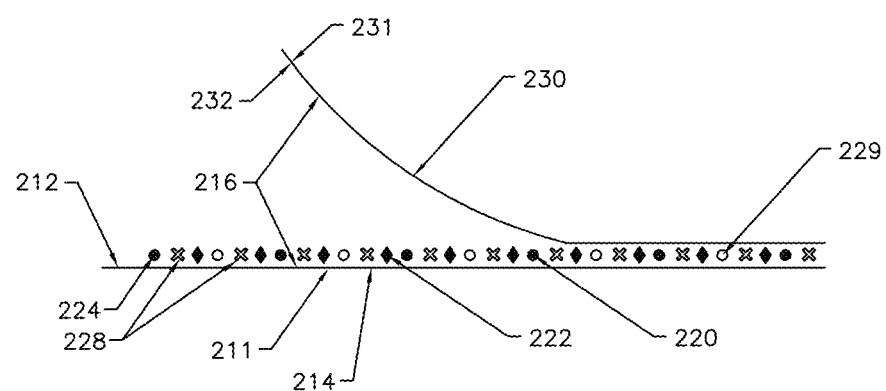
FIG. 2B is a side view of a seed carrier in which the seeds and soil amendments are positioned between and adhered to two layers, a support layer and a cover layer, of polyvinyl alcohol film so the seeds cannot move.

FIG. 2B is a side view of a seed carrier 200 in which the seeds and soil amendments are positioned between and adhered to two layers of film or porous material. In this example, the seed carrier 200 sandwiches a seed layer 220 between support layer 211 and a cover layer 230. In one example, the support layer 211 is provided as a polyvinyl alcohol support film; and the cover layer 230 is provided as a polyvinyl alcohol support film. In this example, the seed layer 220 includes a plurality of seeds of a first seed type 222 and a second seed type 224, a plurality of fertilizing agent particles 228, and a plurality of moisture retention agent particles 229.

Figure 2C:
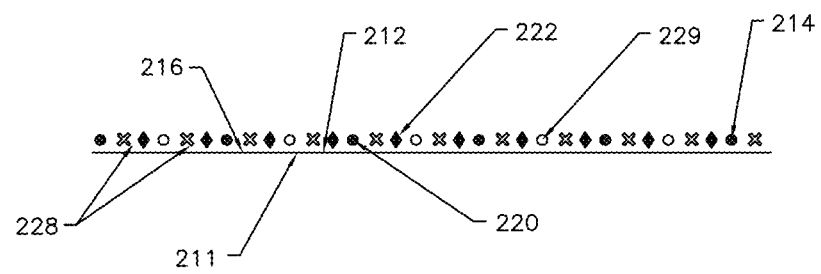
FIG. 2C is a side view of a single layer seed carrier in which the seeds and soil amendments are positioned on and adhered to the top surface of the seed carrier.

FIG. 2C is a side view of a seed carrier 220 in which the seeds and soil amendments are positioned on and adhered to the top surface 212 of a support film layer 211. In this example, no cover layer is provided.

Figure 3A:
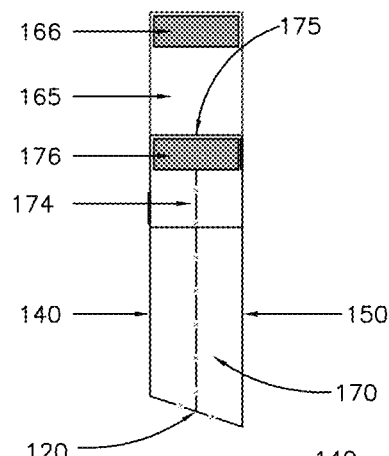
FIG. 3A is a left side view of a inclined face gusseted fabric block-shaped container with open back flaps.
Figure 3B:
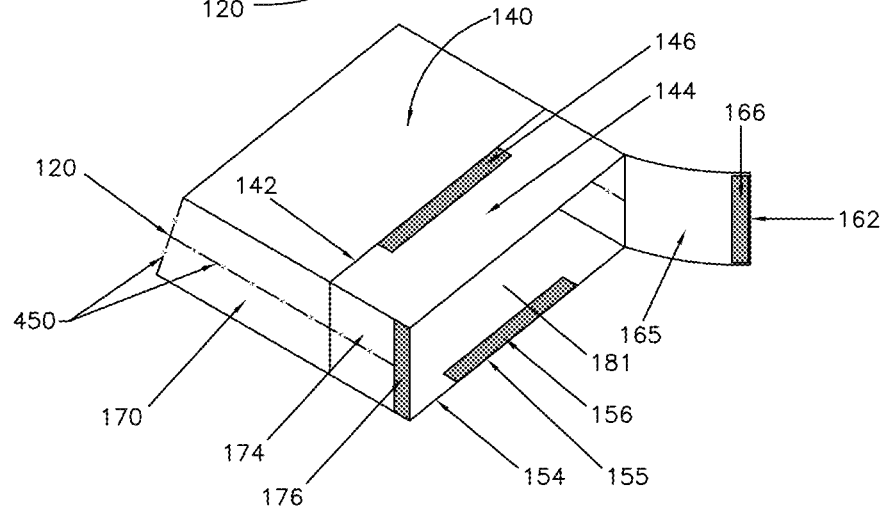
FIG. 3B is a top perspective view of a inclined face gusseted fabric block-shaped container of FIG. 3A with open back flaps.

FIG. 3B is a top perspective view of an inclined face gusseted fabric block-shaped container with open back flaps. The top, left side and back faces are visible. In this example, an open porous fabric block-shaped container 102 has an inclined front face 120, a top face 140, a bottom face 150 (not labeled), a right side face 160 (not labeled), a left side face 170, an open rear 181, and sewn seams 450. In this example, the rear face will be formed by closing flaps extending from the top, bottom, and side faces. The top face flap 144 has a length equal to the thickness of the block, and extends from the top face, and includes an upwardly facing section of hook and loop fastener 146 attached to the exterior of the flap in proximity to the rear edge 142 of the top face. The bottom face flap 154 has a length equal to the thickness of the fabric block, and extends from the bottom face and includes an upwardly facing section of hook and loop fastener 156 attached to the interior surface of the flap proximity to the rear edge 155 of the bottom flap. The right face flap 164 has a length equal to the thickness of the fabric block. In this example, the right flap extension 165 extends from the right face flap 164. The length of the right face flap 164 plus the length of the right face flap extensions equals the width of the fabric block minus the length of the left flap 174. An inwardly facing section of hook and loop fastener 166 is provided near the rear edge 162 of the right face. In this example, the left flap 174 has a length equal to the thickness of the fabric block, and extends from the left face. An outwardly facing section of hook and loop fastener 176 is provided near the rear edge 175 of the left flap. The right flap extension 165 and left flap 174 are designed to overlap slightly so that their hook and loop fasteners can mate at a point to secure the flaps at width equal to the width of the top and bottom faces.

Figure 3C:
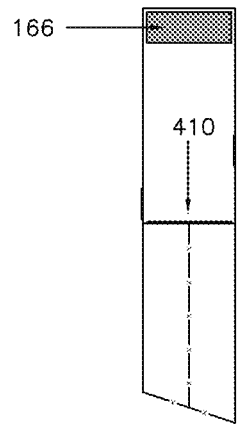
FIG. 3C is a side view of the inclined face gusseted fabric block-shaped container of FIG. 3A with the left side flap folded inward.
Figure 3D:
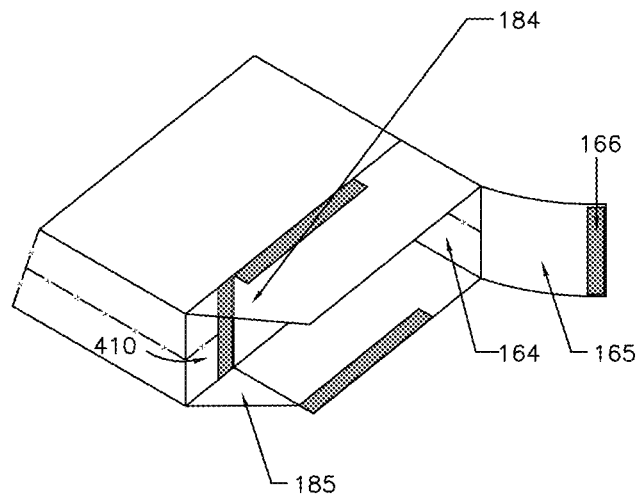
FIG. 3D is a top perspective view of the inclined face gusseted fabric block-shaped container of FIG. 3A with the left side flap folded inward.

FIG. 3D is a top perspective view of the inclined face gusseted fabric block-shaped container 102 with the left flap folded inward. A left face fold 410 is made by folding the left flap 164 inward, thereby creating triangular fold section 184 on the left end of the top face 140, and triangular fold section 185 on the left end of the bottom face 150.

Figure 3E:
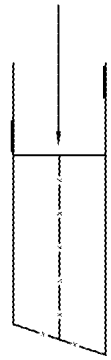
FIG. 3E is a side view of the inclined face gusseted fabric block-shaped container of FIG. 3A with the left and right side flaps folded inward.
Figure 3F:
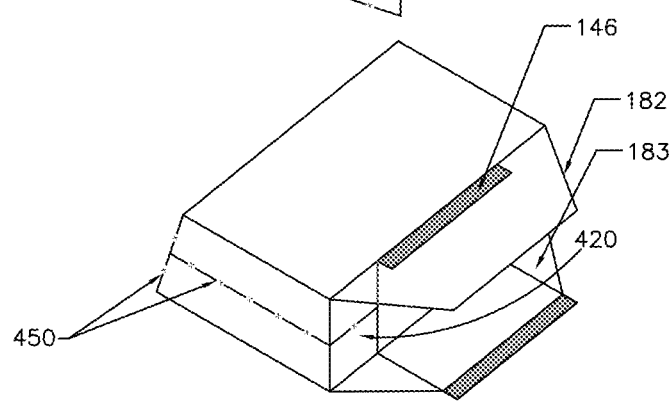
FIG. 3F is a top perspective view of the inclined face gusseted fabric block-shaped container of FIG. 3E with the left side flap and the right side flaps folded inward.

FIG. 3F is a top perspective view of the inclined face gusseted fabric block-shaped container 102 with the left flap 174 folded inward and the right flap folded inward. A right face fold 420 is made by folding the right flap 164 and the right flap extension 165 inward, and securing the inwardly facing section of hook and loop fastener 166 to the outwardly facing section of hook and loop fastener 176 of the left flap 174, thereby creating triangular fold section 182 on the right end of the top face 140 and triangular fold section 183 on the right end of the bottom face 150.

Figure 3G:
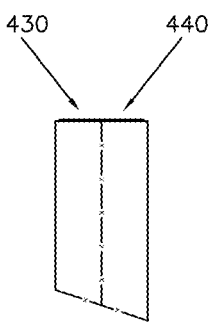
FIG. 3G is a side view of the inclined face gusseted fabric block-shaped container of FIG. 3F with left and right and top and bottom flaps folded inward and secured with hook and loop fasteners.
Figure 3H:
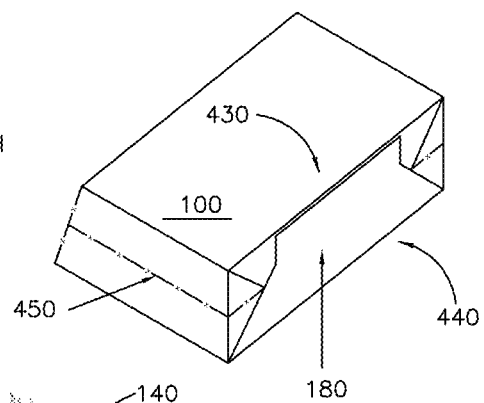
FIG. 3H is a top perspective view of the inclined face gusseted fabric block-shaped container of FIG. 3G with left and right and top and bottom flaps folded inward and secured with hook and loop fasteners.

FIG. 3H is a top perspective view of the inclined face gusseted fabric block-shaped container 102 with left flap and right flap and right flap extension folded inward and the top and bottom flaps folded inward. A top face fold 430 is made by folding top face flap 144 inward. A bottom face fold 440 is then made by folding bottom face flap 150 inward and securing inwardly facing section of hook and loop fastener 156 to outwardly facing section of hook and loop fastener 146.

Figure 3I:
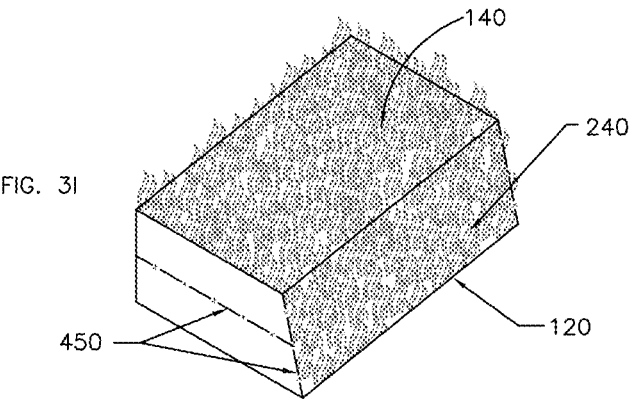
FIG. 3I is a top perspective view of the inclined face gusseted fabric block-shaped container of FIG. 3H with vegetation growing on the exposed top surface and inclined front surface.

FIG. 3I is a top perspective view of the inclined face gusseted fabric block-shaped container, 102 of FIG. 3H with vegetation, 240 growing on the exposed top surface, 140 and inclined front surface, 120.

FIG. 3A is a left side view of a inclined face gusseted fabric block-shaped container 102 with open face flaps. FIG. 3C is a side view of the inclined face gusseted fabric block-shaped container 102 with the left flap 174 folded inward. FIG. 3E is a side view of the inclined face gusseted fabric block-shaped container 102 with the left and right flaps folded inwards. FIG. 3G is a side view of the inclined face gusseted fabric block-shaped container 102 with left flap and right flap and right flap extension folded inward and the top and bottom flaps folded inward.

This folding process produces an example gusseted porous fabric block-shaped container which facilitates the placement of a seed carrier against the inside inclined front face surface, or against the inside top face surface as described below, and facilitates the on-site or factory filling of the blocks. The rear flaps of this example permit a uniform rear closure and flat rear face.

A fabric block-shaped container with a vertical front face may be constructed in a similar manner to FIGS. 3A-3I where the front face is orthogonal to the side faces rather than inclined.

Example—Preparing Vertical Front Face Block-Shaped Containers

In one example, block-shaped fabric containers may be formed with the following procedure:
Step 100 mark cut lines
Step 101 cut fabric block material
Step 110 mark fold and sew lines
Step 111 sew along sew lines to create front face gussets
Step 115 sew along side sew lines to create sides
Step 120 mark cut lines for right face flap extension
Step 121 cut right face flap extension
Step 122 sew right face flap extension to right face flap
Step 130 cut hook and loop fastener to desired lengths
Step 131 sew hook and loop fastener onto top face flap
Step 132 sew hook and loop fastener onto bottom face flap
Step 133 sew hook and loop fastener onto left face flap
Step 134 sew hook and loop fastener onto right face flap extension
Step 140 turn fabric block inside out
Step 150 crease fabric block along fold lines until fabric block has taken a rigid block form Example—Preparing Inclined Front Face Block-Shaped Fabric Containers In another example, block-shaped fabric containers with an inclined face may be formed with the following procedure:
Step 100 mark cut lines
Step 101 cut fabric block material
Step 110 mark cut lines for inclined face
Step 111 cut inclined face cutout
Step 120 mark fold and sew lines
Step 121 sew along sew lines to create front face gussets
Step 125 sew along side sew lines to create sides
Step 130 mark cut lines for right face flap extensions
Step 131 cut right face flap extension
Step 132 sew right face flap extension to right face flap
Step 140 cut hook and loop fastener to desired lengths
Step 141 sew hook and loop fastener onto top face flap
Step 142 sew hook and loop fastener onto bottom face flap
Step 143 sew hook and loop fastener onto left face flap
Step 144 sew hook and loop fastener onto right face flap extension
Step 150 turn fabric block inside out
Step 160 crease fabric block along fold lines until fabric block has taken a rigid block form with an inclined front face In one example, the porous fabric container material is a knitted polyethylene fabric that creates a porous exterior of the block.

In other examples, the front face may be vertical rather than inclined.

In other examples, the length of the left flap can be the same as the length of the right flap, and the hook and loop material may be positioned on the exterior of the left and right flaps, so that a separate elongated strap can be provided with hook and loop fasteners on both ends.

In other examples, the hook and loop fastener material may be omitted from the right and left flaps, so that the rear end is closed folding the side flaps in and then securing the bottom flap to the top flap, such as described above.

In other examples, the hook and loop fastener material may be omitted, then the flaps can be secured by other means such as sewing, stapling, heat fusing or tying.

In one embodiment, a gusseted porous fabric block-shaped container is sewn out of a porous woven fabric and filled with growth media and incorporating a plant growth promotion structure creating a block-like shape that can be used for building vegetated retaining walls or slope faces that might otherwise be built out of stone or concrete blocks.

In one embodiment, a gusseted porous fabric block-shaped container is sewn out of a relatively porous non-woven fabric and filled with growth media creating a block-like shape. Blocks of this configuration may be externally vegetated with the aid of the media retention sleeve into which hydromulch is applied to establish vegetation.

In one embodiment, a gusseted porous fabric block-shaped container is sewn out of a porous three-dimensional continuously woven matrix of polypropylene yarns and filled with growth media creating a block-like shape.

In one embodiment, a gusseted porous fabric block-shaped container is sewn out of an open structure matrix of fused fibers that is fused or sewn to a porous fabric and filled with growth media creating a block-like shape Promoting Vegetation The growth of vegetation can be enhanced by placing growth media in porous fabric block-shaped containers to create vegetated retaining wall blocks. The growth media can contain a mixture of many different soils and soil amendments. Some of these include topsoil, a highly porous perlite, vermiculite, peat moss, superabsorbent polymers, humus, and compost. To increase strength of the block, the growth media can be compacted slightly causing the fabric sides of the block to be put under tension and create intimate contact between the growth media and the porous fabric walls of the block. The use of superabsorbent polymers and perlite provides a light weight, but tightly packed, block that supports good root growth in and through the block and into adjacent blocks.

The superabsorbent polymers will expand when moistened and put the block fabric walls under more tension creating a stable block and intimate fabric wall and growth media contact. When the superabsorbent polymers absorb moisture they typically expand to at least 30 times their size which assures completely filled blocks and assures good soil to block wall contact without the need to further compact the growth media. This intimate contact between the growth media and the block walls assures that when internal seeds germinate, the plant growth passes through the porous fabric and allows consistent vegetative establishment. In the case of exterior planting, roots are able to contact the soil and establish vegetation.

The blocks can be seeded internally giving the option to grow a variety of plants including but not limited to grasses, vines, flowering plants and succulents. When the blocks are filled with growth media they are filled with the exposed face down, making it easy to throw seed into the face of the block or to place a seed carrier inside the block and then fill the block with growth media. A seed carrier may be made with a water absorptive rapidly biodegrading mat, sheet or film. This sheet is sprayed with a water-soluble adhesive and seed is spread onto the sheet and adhered to it. The seed carrier can also be provided as a polyvinyl alcohol film that is wetted to become adhesive allowing seeds to adhere to the film. The seed carrier can either be a single sheet with seed adhered to it or comprised of two sheets with seed sandwiched in between. Additionally, fertilizer may be mixed in with the adhesive or wetting liquid when it is sprayed onto the mat. Granular fertilizer and/or superabsorbent polymers can also be spread onto the seed carrier with the seed.

The blocks can be pre-vegetated prior to construction of the final structure form, which is beneficial, allowing immediate root growth into adjacent blocks and surrounding soil thus locking the wall together and anchoring it to adjacent soil zones. Additionally, the pre-established vegetation will reduce soil loss from the wall maintaining strength of the wall.

In one embodiment, a mesh is sewn into the exposed face(s) of the block. The shape of the block will be more uniform to increase appeal of the block to installers and consumers. The uniform shape also increases the strength of the wall since the weight of the wall and load on it can be evenly distributed among all blocks. Uniformly shaped blocks are also easier to build with since the blocks fit together similarly to typical building blocks.

The blocks can be made with a front face that is vertical or has an incline. The vertical face block would be particularly useful for slope facing applications because the blocks would be square and lay next to each other without gaps that would otherwise channel and concentrate flow causing erosion. These vertical faced blocks may also be used to create walls. The blocks with an inclined face are particularly useful for building vegetated walls. The slope of the front face of the blocks produces better plant growth since the blocks will absorb more water through the face during rainfall events or during irrigation, the plants receive more sunlight, and the slope on the face allows the plants to grow vertically with less obstruction.

Additionally, the sloping face will allow seedlings to be deposited onto the face during seed dispersion, allowing the vegetated structure to replant itself.

In one embodiment, the block is wrapped in a media retention sleeve. This sleeve is made of an open structure matrix of fused fibers that is sewn into a sleeve shape that can be slid around the block. The sleeve is elastic and smaller in circumference than the outside of the block and is stretched and slid over the outside of the block preventing it from sliding off the block. The sleeve increases the friction of the blocks and stops the blocks from sliding out of the wall which reduces the need for anchoring the blocks together. Further, the sleeve can be made of a rubberized filament creating a more frictional interlock. This sleeve creates an open structure to which hydraulically applied mulch can be sprayed into and trapped within creating a method for external seeding.

In one embodiment, the blocks have a hook and loop closure on the back or bottom of the block that can be used to close the block. Since the hook and loop fastener is two inches wide there is enough adjustability to put the fabric under tension when closing the block. The closure is folded like a present. After the block is filled and closed the closure system creates a loop that can be used like a handle making the blocks easier to carry. Additionally, a bar or board may be threaded through this loop and two people can easily carry multiple blocks at a time. A bar can be threaded through this loop in between adjacent blocks and used to anchor the blocks into the soil with soil anchors.

Media Retention Sleeve

Figure 13A:
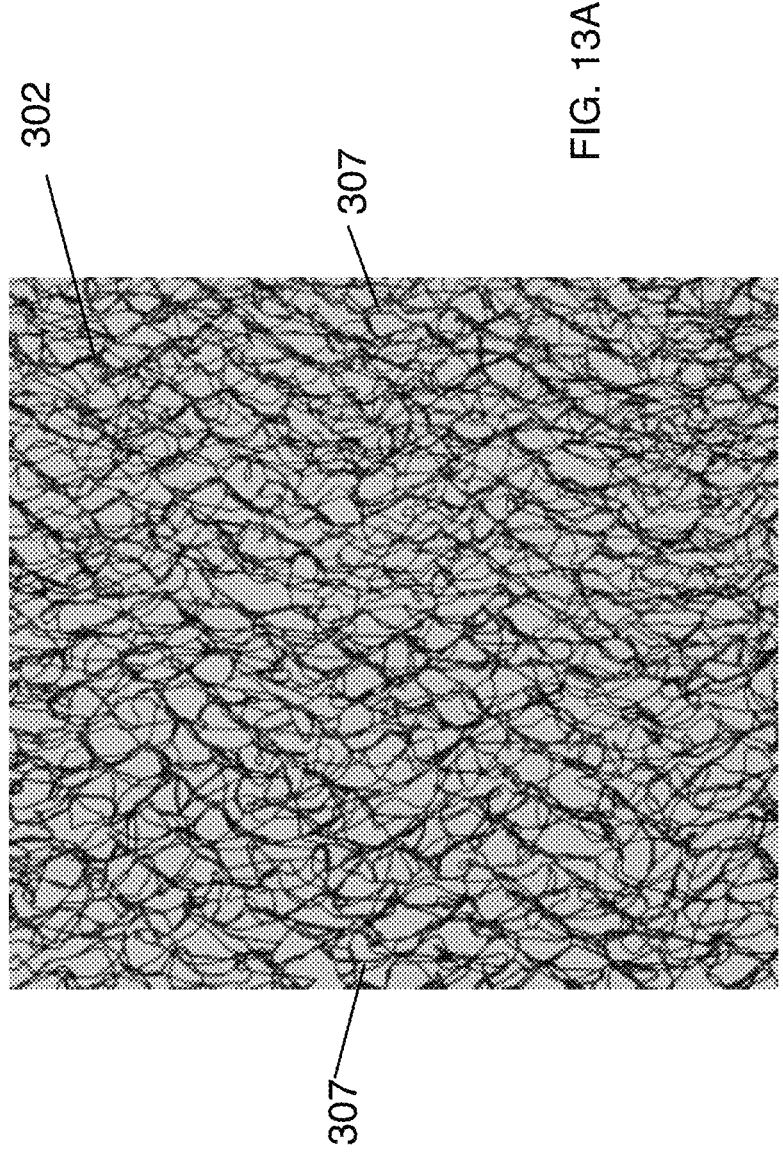
FIG. 13A is a top view of an example media retention sleeve material.
Figure 13B:
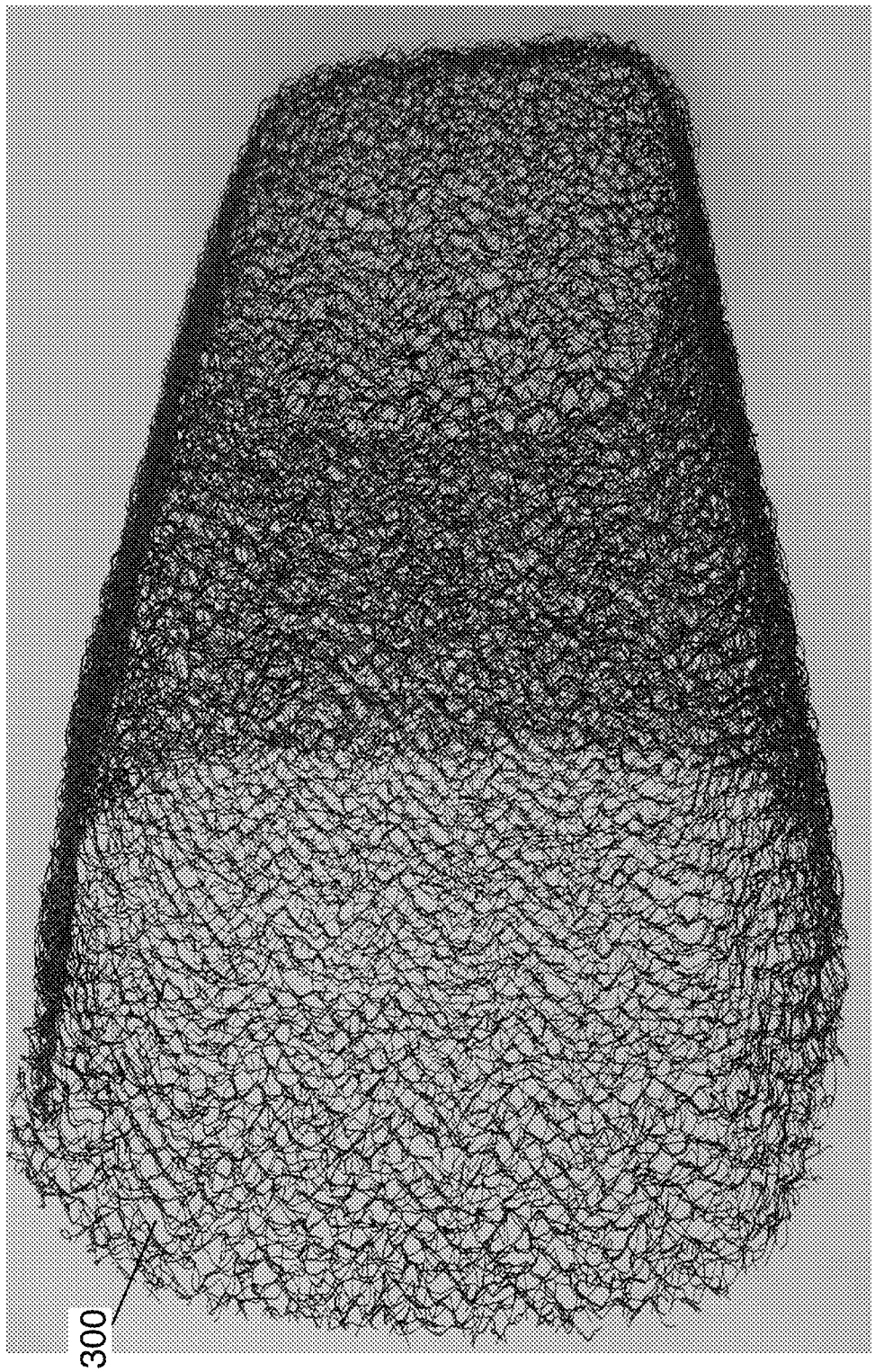
FIG. 13B is a top perspective view of an example media retention sleeve.
Figure 14:
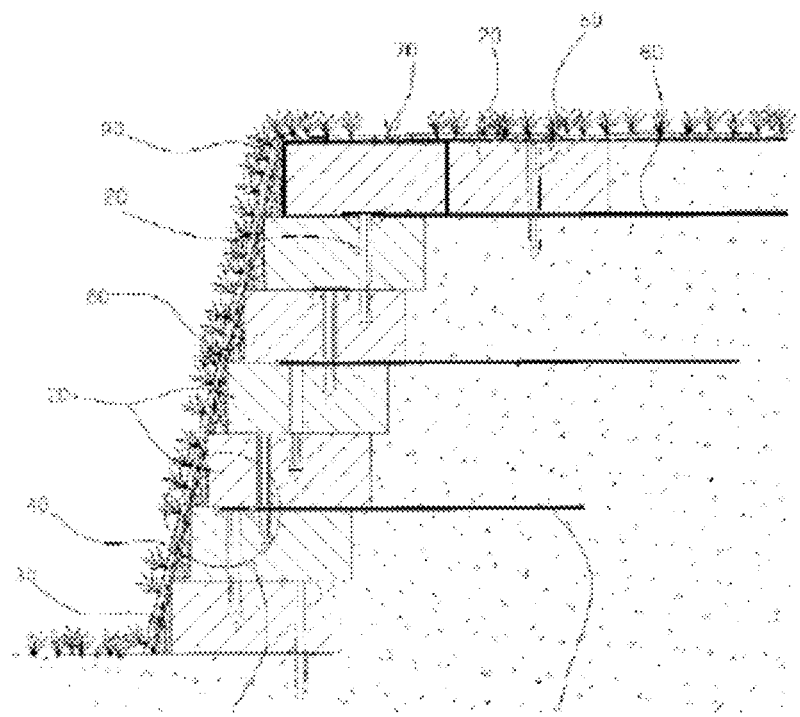
FIG. 14 (PRIOR ART) is a side cross section view of a retaining wall constructed of soil bag blocks with seeds implanted in an overlaying a core net of US Patent Application Publication 20110110728.
Figure 15:
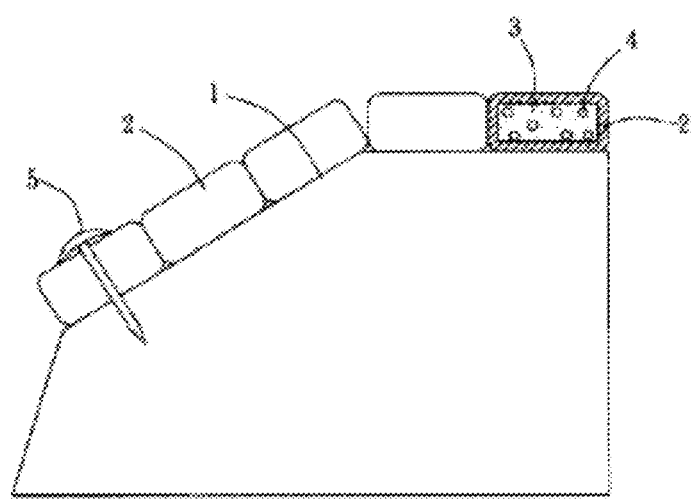
FIG. 15 (PRIOR ART) is a side cross section view of a retaining wall constructed of soil bag blocks with seeds provided in bag fill material of U.S. Pat. No. 8,230,643.
Figure 16:
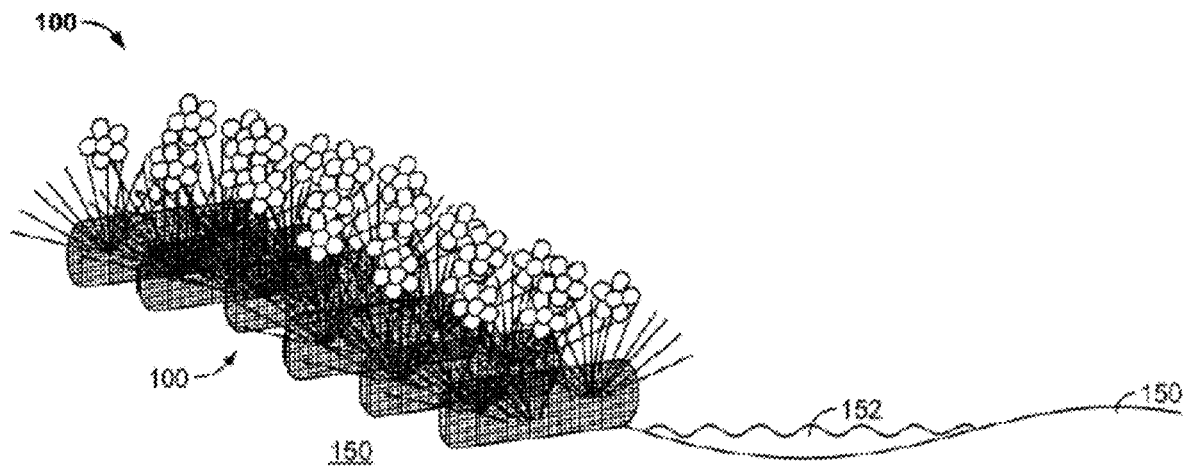
FIG. 16 (PRIOR ART) is a side cross section view of a bank reinforcement constructed of biodegradable soil bags with seeds provided in bag fill material as described in US Patent Publication US 2014-0190076.
Figure 17:
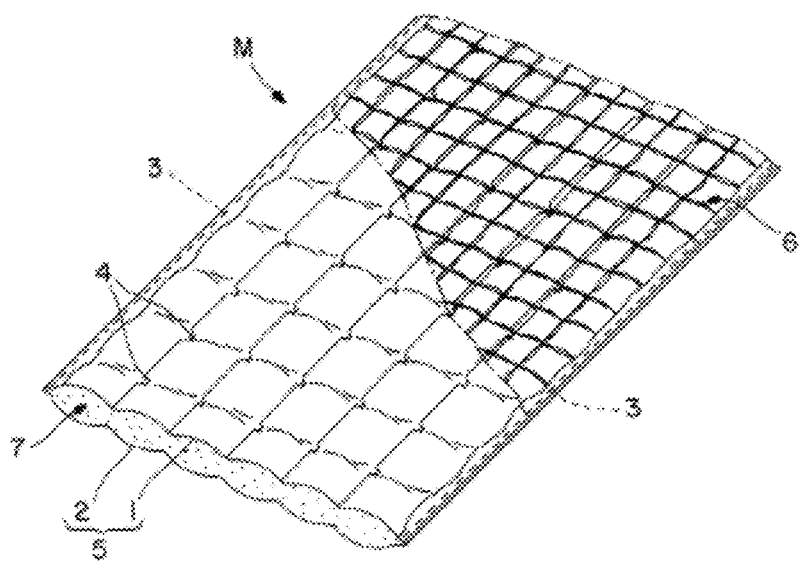
FIG. 17 (PRIOR ART) is a top perspective view of vegetation mat of U.S. Pat. No. 5,421,123.

FIG. 13A is a top perspective view of an example media retention sleeve 300. FIG. 13B is a top view of an example three dimensional media 302. In this example, two edges 305 and 306 of the three dimensional media 302 are sewn in order to create the sleeve. The sleeve may be expanded slightly for insertion over a block. The three dimensional media includes loops 307 of filament that serve to increase friction between blocks, and to hold hydromulch on exposed surfaces.

Figure 5A:
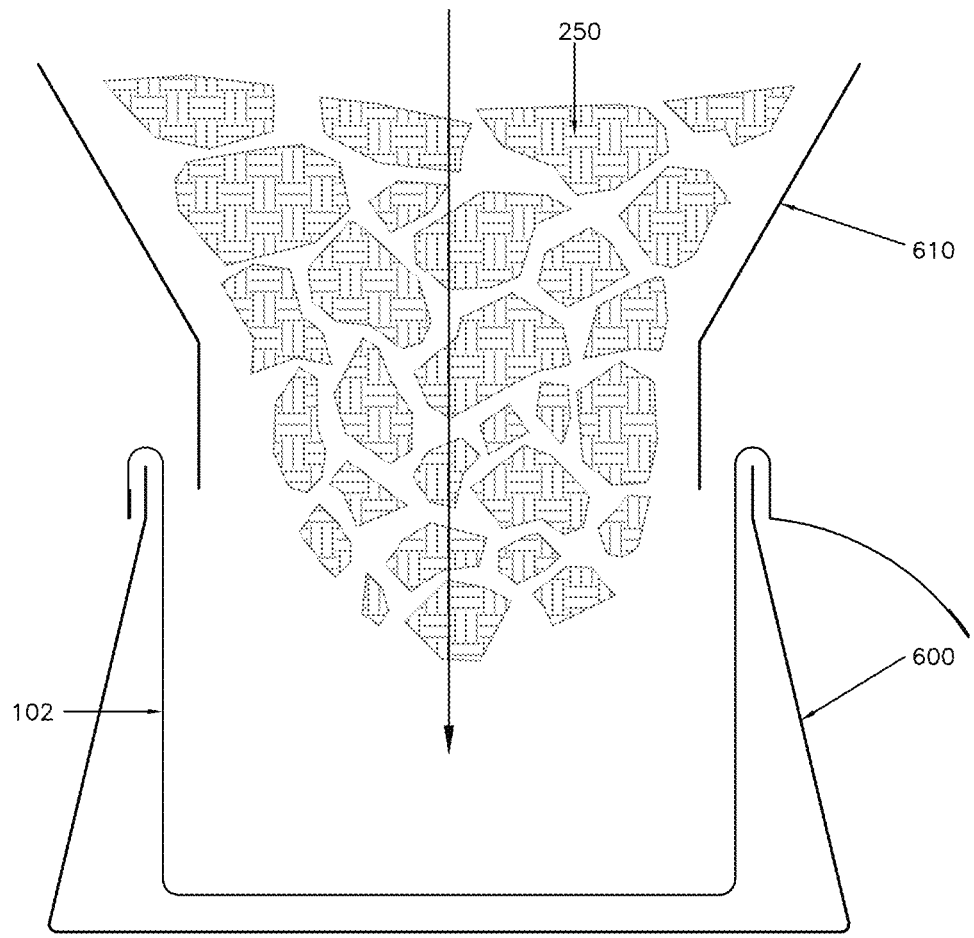
FIG. 5A is a side cross section view of a fabric container in an open position on a hanging support filling frame and being filled with a growth media.

FIG. 5A is a side cross section view of a block-shaped-fabric container in an open position on a support filling frame and being filled with a growth media.

Figure 5B:
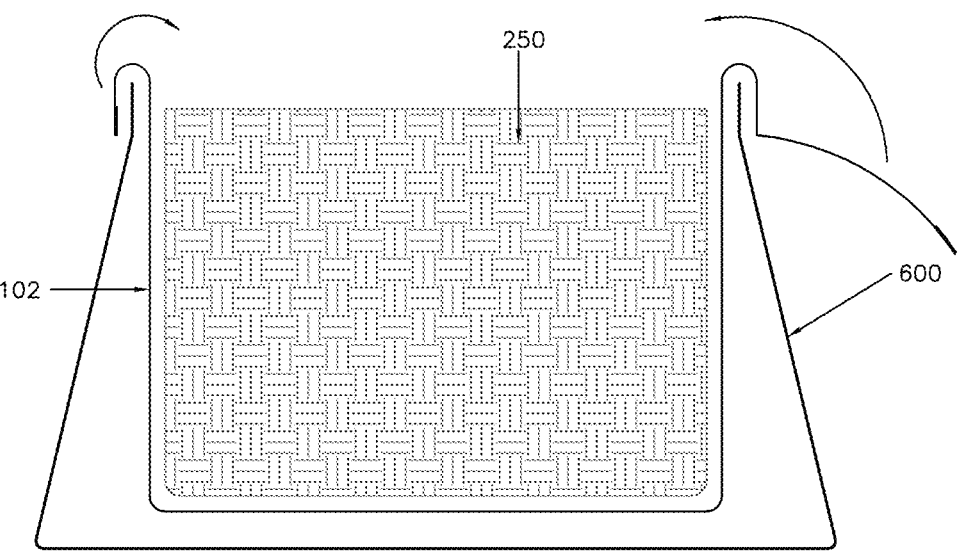
FIG. 5B is a side cross section view of the fabric container of FIG. 5A with open flaps and filled with a growth media.

FIG. 5B is a side cross section view of the block-shaped fabric container with open flaps and filled with a growth media.

Figure 5C:
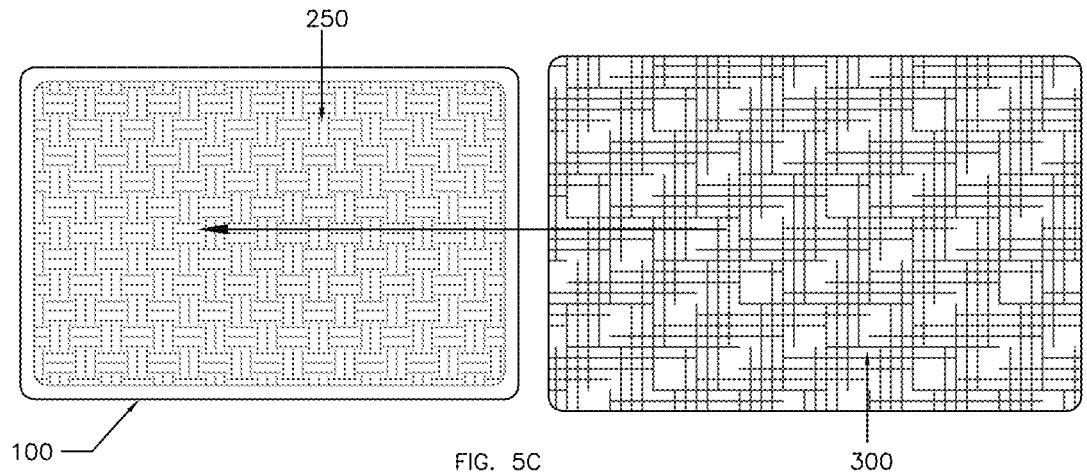
FIG. 5C is a top cross section view of the filled block of FIG. 5B with closed flaps and removed from the support filling frame; and a media retention sleeve positioned for insertion over the block.

FIG. 5C is a top cross section view of the filled block 100 with closed flaps and removed from the support filling frame; and a growth media retention sleeve 300 positioned for insertion over the filled block.

Figure 5D:
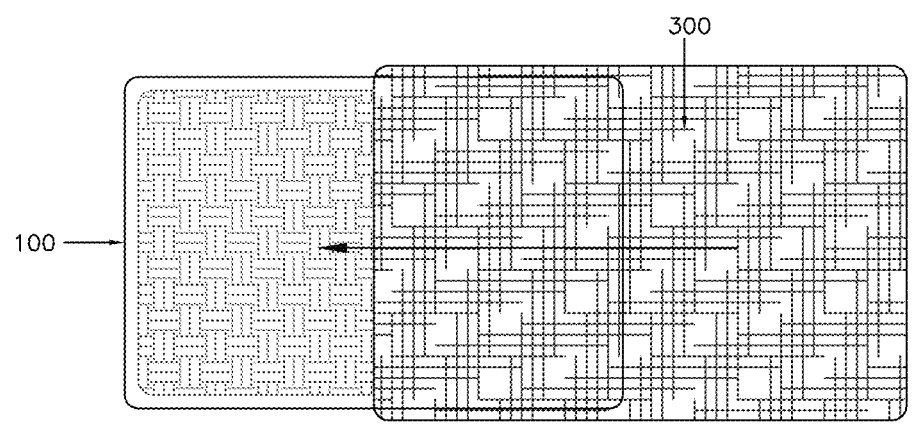
FIG. 5D is a top view of media retention sleeve of FIG. 5C partially covering the block of FIG. 5C.

FIG. 5D is a top view of media retention sleeve 300 partially covering the filled block 100.

Figure 5E:
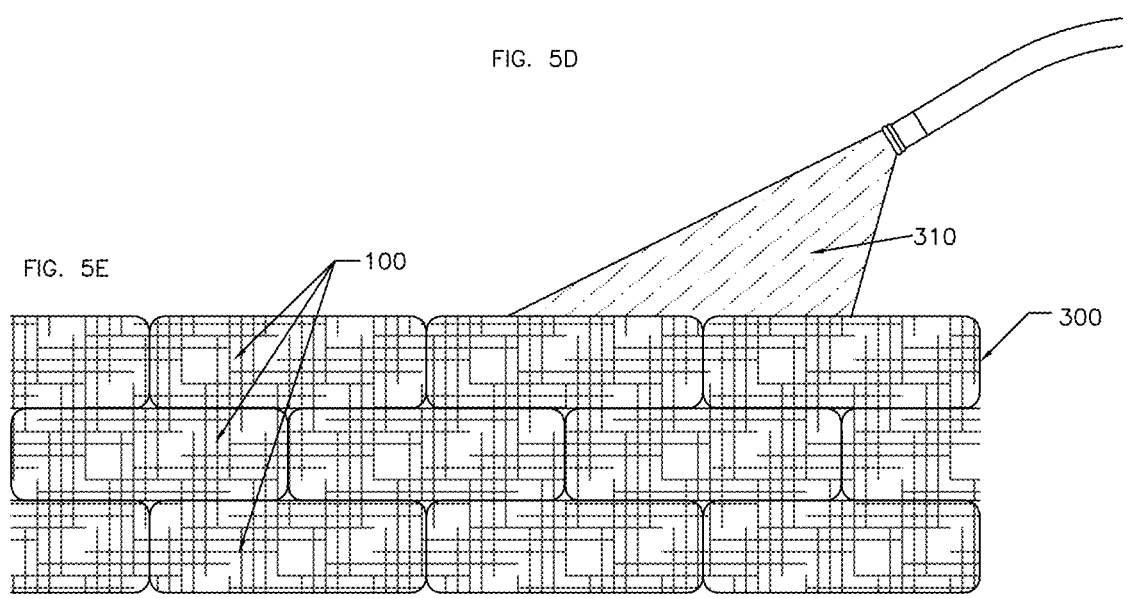
FIG. 5E is a front view of a block stack of filled blocks of FIG. 5D where each block is covered with a media retention sleeve, and hydromulch is being sprayed on the block stack.

FIG. 5E is a front view of a block stack of filled blocks of FIG. 5D where each block is covered with a media retention sleeve 300, and hydromulch 310 is being sprayed on the block stack. In other examples, growth media retention sleeves 300 are provided only on blocks which will have exposed surfaces.

A media retention sleeve may be constructed of an open structure matrix of fused fibers that is sewn into a sleeve shape that can be slid around the block. The sleeve is elastic and smaller in circumference than the outside of the block and is stretched and slid over the outside of the block preventing it from sliding off the block. The sleeve creates an open structure matrix to which hydraulically applied mulch can be sprayed into and trapped within creating a method for external seeding. This growth media retention sleeve may be used in conjunction with or in place of a seed carrier or seed mat. A media retention covering may be affixed to the fabric block by sewing onto a face of the fabric block, or by other means such as stapling or thermal fusing. A media retention sleeve may be used with conventional soil filled non-woven geotextile bags and sprayed with hydromulch to enhance vegetative establishment. Additionally, the media retention covering may be placed around the fabric block by wrapping the exposed face of the block and tucking the mat, comprised of the media retention material, between adjacent block layers.

The sleeve also increases the friction of the blocks and stops the blocks from sliding out of the wall which reduces the need for anchoring the blocks together. The sleeve can be made of a rubberized filament creating a more frictional interlock between blocks. The open mesh of a sleeve permits an area to be reseeded.

In one example, a media retention sleeve is provided in a single mesh material. In other examples, a sleeve may be provided with a mesh material on the face or faces which will be exposed, and a second material, such as a high friction layer may be provided on other faces of a block.

Seed Carrier

In this specification, a seed film, seed mat or seed carrier comprises at least one layer of a support film or organic mat. Seeds and other additives may be adhered to the seed carrier to be held in place. The seed carrier holds the seeds at a desired location and promotes a uniform distribution of seeds and other plant growth agents relative to the exposed surface of a growth media filled block by holding seeds and other agents in place and preventing them from moving during filling of the block-shaped fabric container with growth media, placing and watering. The seed carrier promotes the germination of seeds by holding the seeds at a desired depth near the front or top face of the block in contact with growth media. A seed carrier may be made of a water soluble film such as polyvinyl alcohol which dissolves at a select time by watering the film. It could also be comprised of an organic mat such as wood or cellulose fibers that will biodegrade over time.

Example—Seed Carrier with Support Layer and Cover Layer

FIG. 2B is a side view of a seed carrier 200 in which the seeds and soil amendments are positioned between and adhered to a support layer 211 and a cover layer 230. In one example, the support layer 211 is provided as a polyvinyl alcohol support film; and the cover layer 230 is provided as a polyvinyl alcohol support film. In this example, the support layer 211 has a top surface 212 and a bottom surface 214. A plurality of plant seeds 222 are positioned on the top surface 212 of the support film 211. The seeds are adhered to the support film either using a water soluble adhesive or by means of partially dissolving the top surface 212 of the film causing the wetted surface 216 of the film to have adhesive properties. In this example, the cover layer 230 has a top surface 231 and a bottom surface 232. The bottom surface of the cover layer 232 is adhered to seeds, soil amendments and portions of the top surface of the support film either by using a water soluble adhesive or by means of partially dissolving the bottom surface 232 of the cover film causing the wetted surface 216 of the film to have adhesive properties.

Example—Seed Carrier with Seeds on Top Surface of Single Support Film

FIG. 2C is a side view of a seed carrier 220 in which the seeds and soil amendments are positioned on and adhered to the top surface 212 of a support film layer 211. In this example, no cover layer is provided.

In some examples, the seed carrier 200 may further comprise a plurality of fertilizing agent particles 228 positioned on and adhered to the top or bottom layer of a polyvinyl alcohol support film.

In some examples, the seed carrier 200 may further comprise a plurality of moisture retention particles 229 positioned on and adhered to the top or bottom layer of a polyvinyl alcohol support film 211.

In some examples, the seed carrier 200 may further comprise a plurality of herbicide particles 226 or pesticide particles 227 positioned on and adhered to the top or bottom layer of a polyvinyl alcohol support film 211.

Example—Seed Film with Seeds on Inverted Single Support Film

In other examples, a single cover layer may be used to confine seeds and other materials over growth media. A thin layer of growth media may be added to a block and tamped. Seeds and other materials may be provided on a film. When the seed film is inverted over the tamped material, the support film serves as a cover layer to protect the seeds until water is applied.

Example—Retaining Wall Block with Seed Carrier

In this example, a retaining wall block 100 has a back face, a front face having an exterior surface and an interior surface, a top face having an exterior surface and an interior surface, and a bottom face. A seed carrier 200 is positioned along at least a portion of the interior surface of the front face, or along at least a portion of the interior surface of the top face. The first seed film comprises a support film and at least one seed layer comprising a plurality of plant seeds provided on the support film.

The support film holds the seeds at a desired depth near the exposed surfaces of the retaining wall block, and is designed to permit the seeds to germinate. Germination may be facilitated by providing a support film such as polyvinyl alcohol which dissolves upon contact with water. In this example, water may be deliberately applied after retaining wall blocks are placed, either as irrigation or rainfall causing the film to dissolve, initiating germination and moisten the fill material.

Other examples of degradable support films include organic mats such as wood or cellulose fibers.

In other examples, the seed carrier may be provided on the front face, or both the front face and the top face.

Example Method of Filling Fabric Containers with Seed Carriers

Figure 6A:
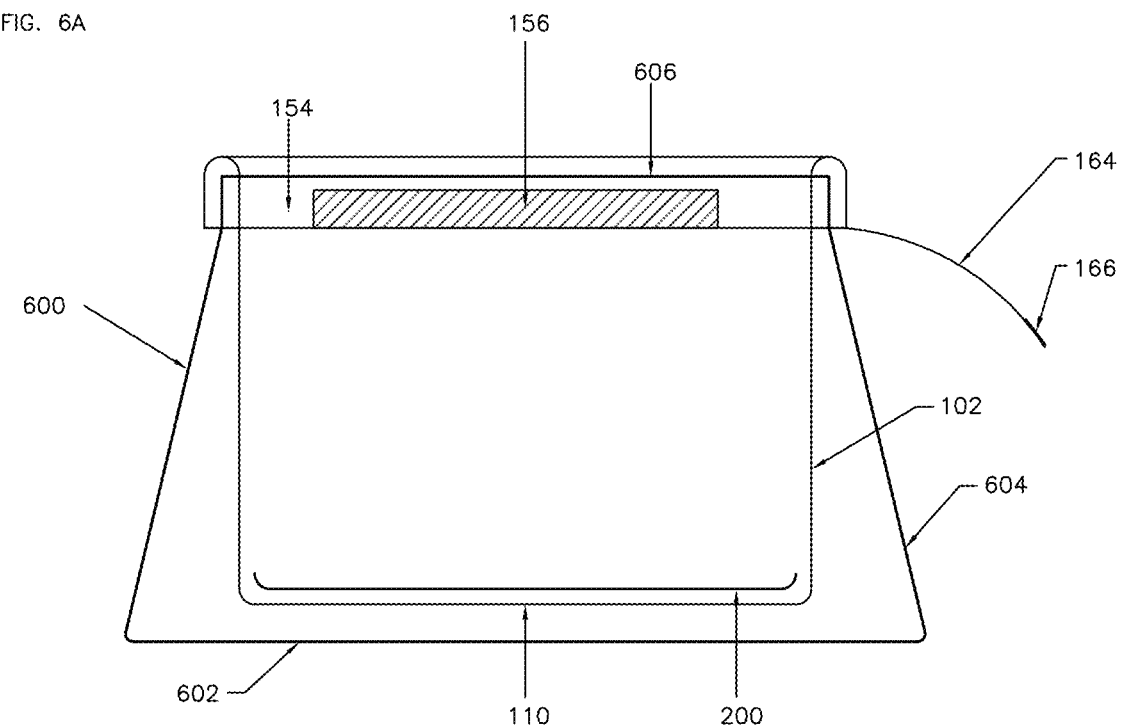
FIG. 6A is a side view of a hanging support filling frame and an empty block-shaped fabric container.
Figure 6B:
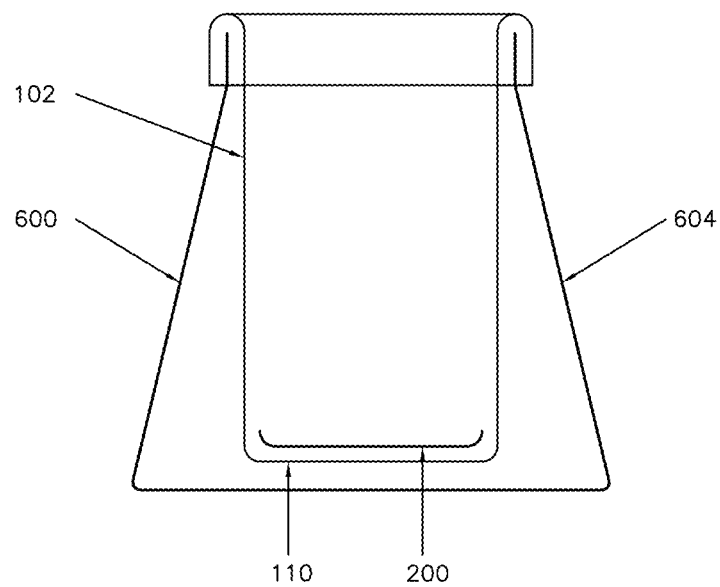
FIG. 6B is an end view of the hanging support filling frame and an empty block-shaped fabric container of FIG. 6A.

FIG. 6A is a front view of a hanging support filling frame 600 and an empty block-shaped fabric container 102. FIG. 6B is a side view of the hanging support filling frame and a block-shaped fabric container of FIG. 6A. In this example, the support filling frame is a steel rod structure with a base 602, angled side walls 604, and a top frame 606.

FIG. 4A is a side cross section view of an empty block-shaped fabric container 102 with seed carrier supported in an open position on a support filling frame 600. An empty fabric container is inserted in the support filling frame so that the top, bottom and side flaps of the fabric container wrap over the top frame 606 of the support filling frame. For clarity, the figure shows the lower portion of the fabric container as slightly elevated above the ground or table. This slight gap allows the fabric container material to elongate slightly assuring that the fabric is in tension as it is being filled with growth media. As the fabric material elongates, the lower surface would typically rest against the ground or support surface in order to permit the growth media to be tamped or otherwise compressed. The flaps may be temporarily attached to the top frame of the support filling frame with clips (not shown). In this example, a seed carrier 200 is positioned in the lower portion of the block-shaped fabric container before growth media is added to the block-shaped fabric container.

Figure 4C:
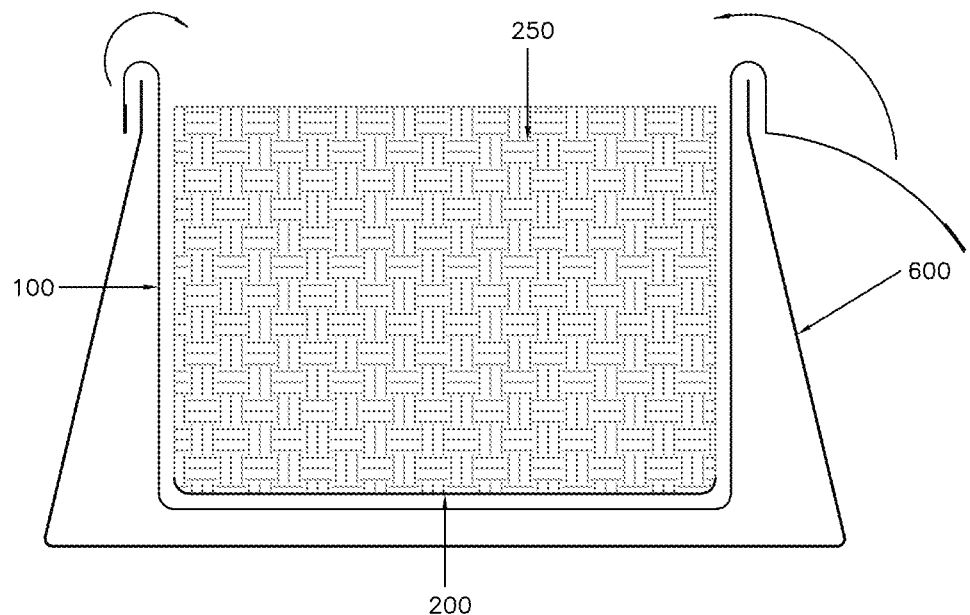
FIG. 4C is a side cross section view of the fabric container of FIG. 4B with open flaps and filled with a growth media.
Figure 4D:
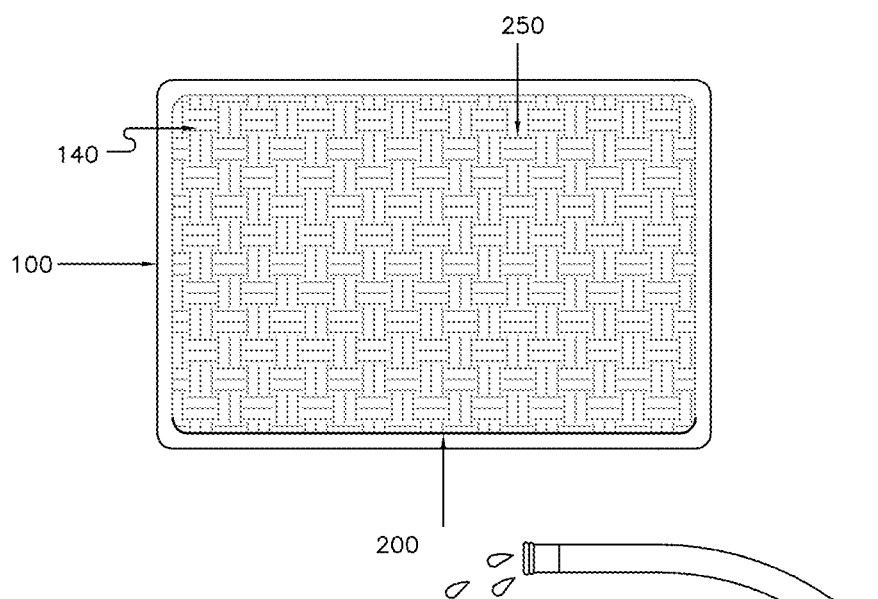
FIG. 4D is a top cross section view of the filled wall block of FIG. 4C with closed flaps and removed from the filling frame.

FIG. 4B is a side cross section view of an empty block-shaped fabric container 102 being filled with a growth media 250 from a funnel or growth media hopper 610. FIG. 4C is a side cross section view of the block-shaped fabric container 102 with open flaps and filled with growth media 250. FIG. 4D is a top cross section view of the filled fabric block 100 with closed flaps and removed from the support filling frame.

Figure 4E:
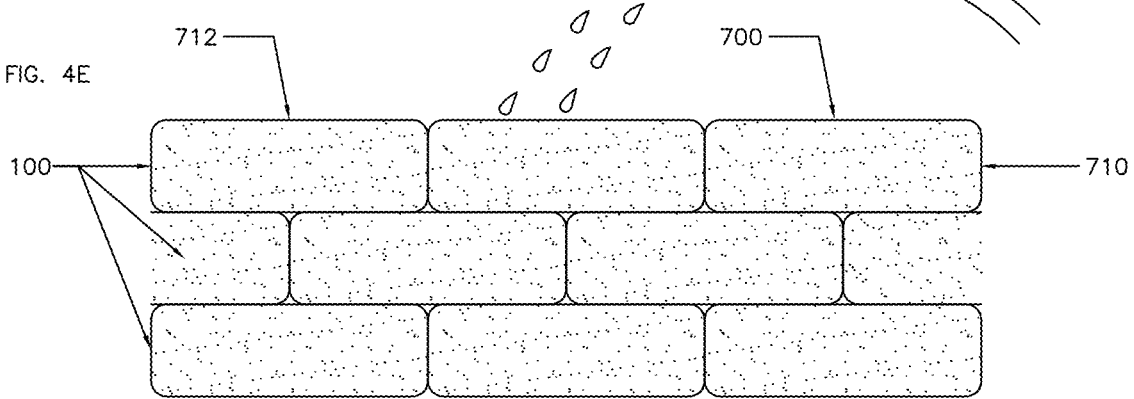
FIG. 4E is a front view of a stack of filled blocks with seed carrier oriented toward the exposed front surface of the block stack.

FIG. 4E is a front view of a block stack 700 formed from a plurality of filled blocks 100. In this example, the seed carriers of the top layer 710 of filled blocks are oriented upwards toward the exposed top surface 712 of the block stack. Seeds are contained near the tops of the upper layer of blocks, and along the front of exposed faces of all the blocks where rain or watering the exposed surfaces will initiate seed germination.

The retaining wall block may be provided as a pre-filled block with fill material and the seed carrier; or may be provided as an unfilled porous fabric block-shaped container with seed carrier that can be filled on site; or may be provided as a porous fabric block-shaped container and separate seed carrier roll or sheet that can be placed in a unfilled fabric container and then filled with growth media on-site.

Example retaining wall blocks are typically 4-8" high, by 12-24" wide, and 6-18" deep, but can be larger or smaller than these dimensions. A common retaining wall block size is 6" high by 18" wide by 12" deep.

Example—Pre-Filled Retaining Wall Block with Seed Carrier

In this example, a pre-filled retaining wall block comprises of a gusseted porous fabric block-shaped container with a front face, a rear face, a top face, a left side face, a right side face and a bottom face. A first seed carrier positioned along at least a portion of the interior surface of the front face, or along at least a portion of the interior surface of the top face. The seed carrier comprises a support layer and a plurality of plant seeds positioned on a support film. The fabric block-shaped container is then filled with a soil mixture, closed and transported to a job site. A plurality of blocks are aligned or stacked to form a retaining wall where the top or front faces with the seed carriers are exposed. Water is then applied to the exposed faces in order to dissolve the seed support layer, and to dissolve the cover layer if a cover layer is used, releasing the seeds to come in contact with the soil and germinate.

Example—Filling Retaining Wall Block on Site

In this example, a soil mixture, gusseted porous fabric block-shaped containers and seed carriers are transported to a job site where a first seed carrier is positioned along at least a portion of the interior surface of the front face, or along at least a portion of the interior surface of the top face. The seed carrier comprises a support layer and a plurality of plant seeds positioned on and adhered to a support film. The porous fabric block is then filled with a soil mixture and closed. A plurality of blocks are aligned or stacked to form a retaining wall where the top or front faces with the seed films are exposed. Water is then applied to the exposed faces in order to dissolve the seed support layer, and to dissolve the cover layer if a cover layer is used, thus activating the seeds.

Method of Filling Retaining Wall Fabric Block with Seed Carriers

Referring to FIG. 6A a fabric block support filling frame is provided, and a porous fabric block-shaped container is positioned in the support filling frame with top, bottom and side flaps folded over the frame. A seed carrier is placed in the porous fabric block-shaped container along the inside surface of the front face or other selected face.

In this example, the block-shaped fabric container is placed so that the desired seeded face is positioned at the bottom of the frame. This orientation permits fill material to be placed against the seed carrier.

Other growth promotion agents are added as desired.

In other examples, the growth promotion agents may be provided on one or more separate support films, and the films may be spaced apart in the fabric block, such as by adding a thin layer of fill material such as dirt or compost between the layers.

Methods of Constructing a Vegetated Retaining Wall

Loops may be sewn into the backside corners of the block. These loops can be used as additional carrying handles during installation. Additionally, soil anchors can be attached to the loops to help hold the blocks in place and prevent them from sliding out of the wall. A rod can be threaded through the loops and anchored to the soil behind the wall thus anchoring multiple blocks with just one anchor.

In one embodiment, the blocks can be supplementally anchored together using steel staples or pins. These staples or pins are driven through the top of the block all the way through the block and down into the block underneath it, locking the two together and eliminating them from sliding. This vertical anchor can also be used to connect the blocks to a geogrid sheet to create a mechanically stabilized earth wall.

In one embodiment, soil with the addition of superabsorbent polymers is compressed into a cohesive block, and the block is slid into the block-shaped fabric container. When this block is watered it expands and fills the voids of the block.

In one embodiment, drip irrigation is placed in between the blocks. This irrigation line is hidden from sight and will not easily become dislodged since it is in between the blocks.

FIG. 7A is a side cross section view of a retaining wall 720 utilizing a geogrid reinforcement system connected with geogrid anchors 520 to plurality of retaining wall blocks 100 with an inclined front faces. A plurality of geogrid sheets 500 are positioned on top of retaining wall blocks, and anchored to the blocks, in order to improve wall stability and strength. Vegetation 240 on the inclined front surface 724 may be promoted as described above, such as by providing seed carriers in the the blocks, or by placing a media retention sleeve around the exterior blocks.

FIG. 7B is a side cross section view of a retaining wall utilizing a geogrid reinforcement system connected with geogrid anchors to blocks with an inclined front face. Grass sod is placed on the inclined front face of the retaining wall. A plurality of geogrid sheets 500 are positioned as described above. After construction of the retaining wall, a layer of sod 245 is stapled to the inclined face with sod staples 521.

FIG. 8 is a cross section view of a retaining wall utilizing a geogrid reinforcement system as described above. In this example, the blocks 100 on the inclined front face are setback to form a setback front surface 726.

FIG. 9 is a cross section view of a vertical retaining wall utilizing a geogrid reinforcement system where a portion 501 of the geogrid sheets are wrapped in front of a plurality of vertical faced retaining wall blocks.

FIG. 10 is a cross section view of a vertical retaining wall utilizing a percussion anchoring system 510 connected with connecting rods 530 to blocks with a vertical front face.

Figure 11A:
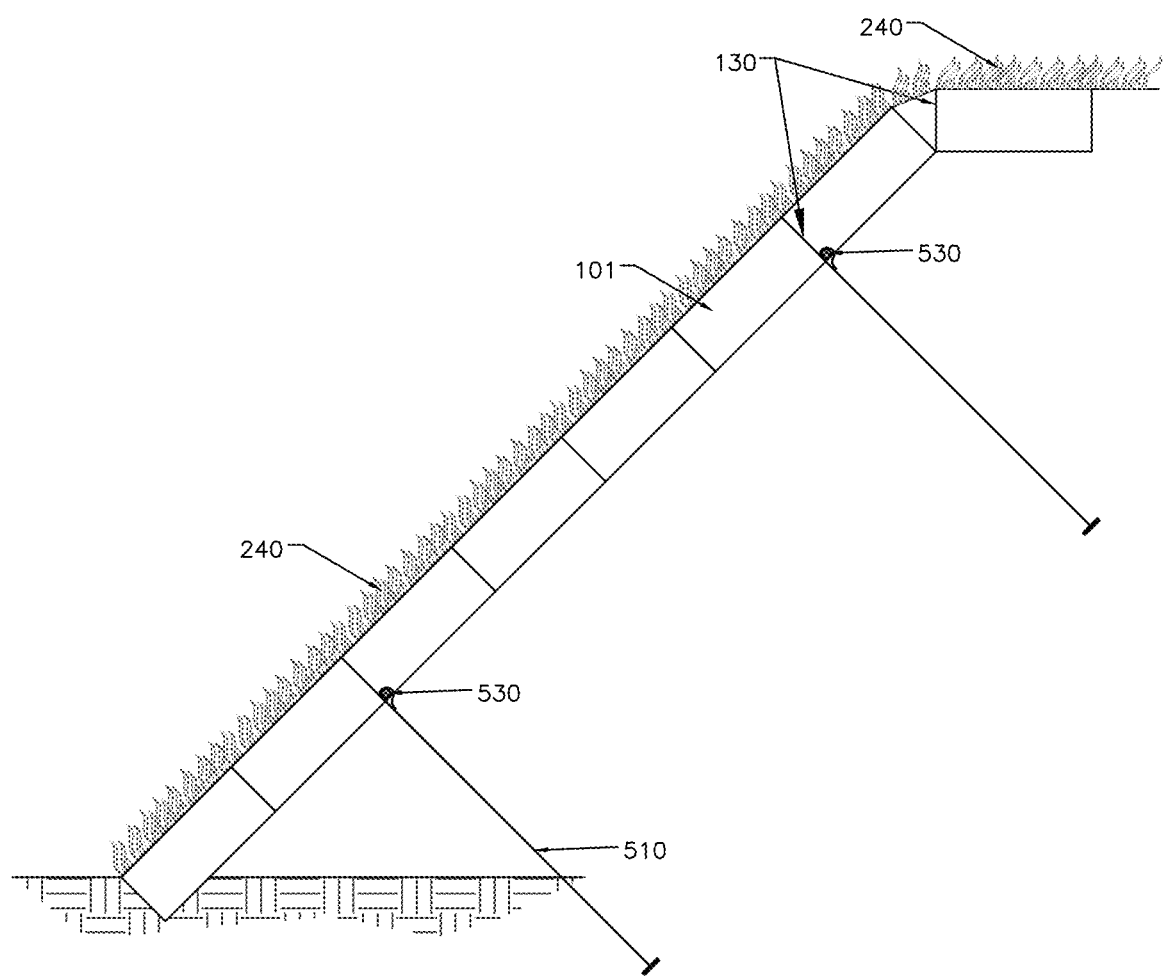
FIG. 11A is a cross section view of a slope facing with vertical faced blocks utilizing a percussion anchoring system connected to the blocks with a rod that is threaded through the back flaps of the blocks.
Figure 11B:
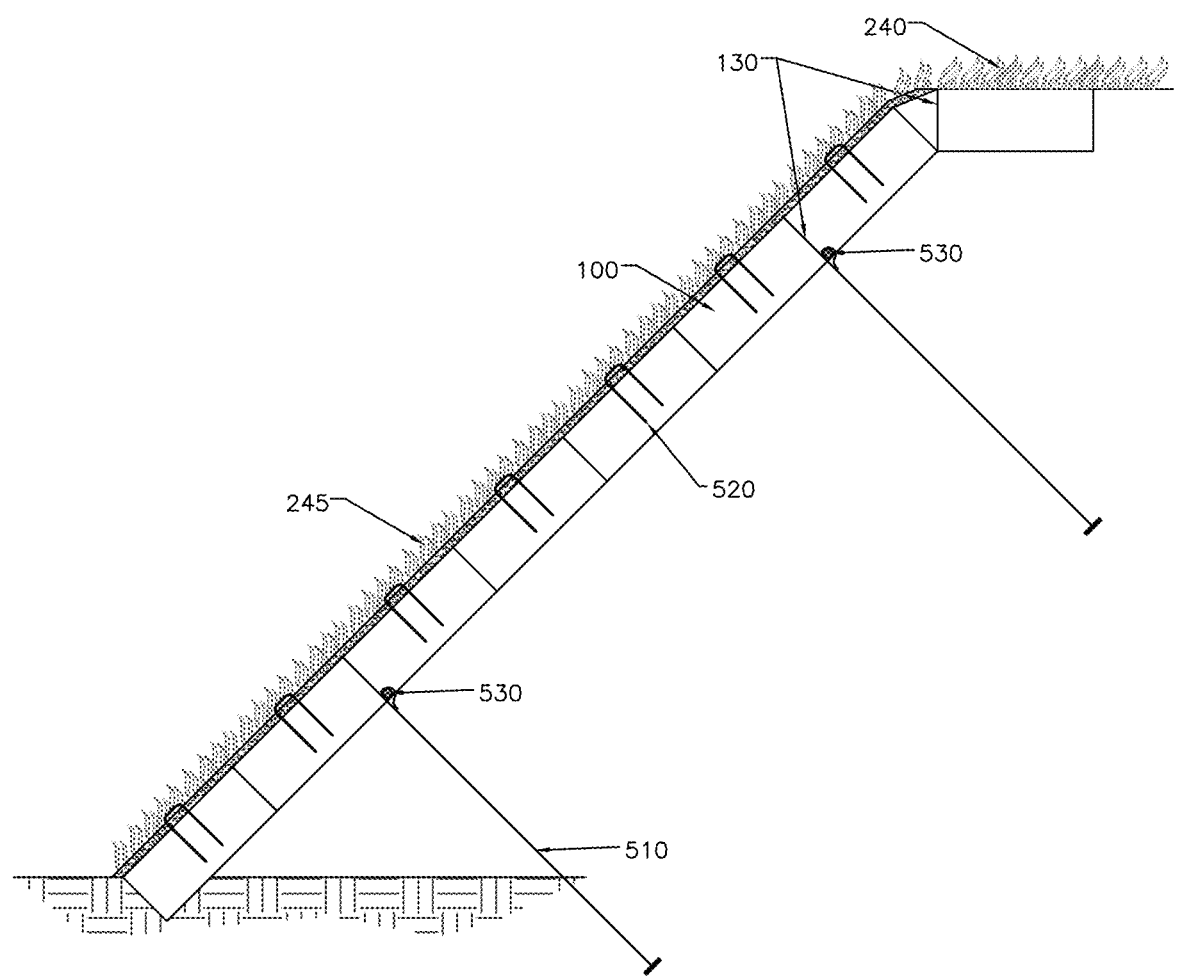
FIG. 11B is a cross section view of a slope facing with vertical faced blocks utilizing a percussion anchoring system of FIG. 11A with sod placed on the slope facing.

FIG. 11A is a cross section view of a slope facing with vertical faced growth media filled fabric blocks utilizing a percussion anchoring system 510 and connecting rods 530. A plant growth promotion structure is utilized to establish vegetation. FIG. 11B is a cross section view of the system of FIG. 11A with sod placed or grown on the slope facing.

Berm Construction

Rectangular blocks or blocks with other geometries, such as trapezoidal or blocks with rounded tops may be provided to construct berms. These blocks may use seed carriers, or hydromulched media retention sleeves to promote vegetation.

Green Roof

Rectangular blocks or blocks with other geometries, may be used to construct or cover a roof. These blocks may use seed carriers, or hydromulched media retention sleeves to promote vegetation.

Prevegetated Blocks

In other examples, prevegetated blocks may be supplied by germinating seeds provided in either a seed carrier, or provided in hydromulched media retention sleeves on the blocks.

Interior or Exterior Architectural Wall Treatment

Rectangular blocks or blocks with other geometries, may be used to construct or cover an exterior or interior wall. These blocks may use seed carriers, or hydromulched media retention sleeves to promote vegetation.

It is to be understood that the specific embodiments and examples described above are by way of illustration, and not limitation. Various modifications may be made by one of ordinary skill, and the scope of the invention is as defined in the appended claims.

What is claimed is:

1. A retaining wall block configured to be vegetated, the retaining wall block comprising
    a gusseted fabric container comprising a porous fabric having at least a 20 percent open surface area, the gusseted fabric container having
        an unfilled orientation, and
        a filled orientation in the shape of a rectangular prism comprising
            a vertical or inclined front face,
            a left side face,
            a right side face,
            a top face,
            a bottom face, and
            a back comprising a folded back face closure,
        wherein the gusseted fabric container is filled from the back with a growth medium; and
    a plant growth promotion structure comprising
        a media retention sleeve comprising a three-dimensional open structure matrix material, such that the media retention sleeve is external to the gusseted fabric container and configured to accept and retain a hydromulch material.

2. The retaining wall block of claim 1 further comprising a seed carrier provided inside the gusseted fabric container, the seed carrier configured to place seeds in proximity to a face of the gusseted fabric container.

3. The retaining wall block of claim 2 wherein the seed carrier is positioned in proximity to the top face of the gusseted fabric container.

4. The retaining wall block of claim 3 wherein the seed carrier further comprises at least one soil amendment selected from the group consisting of a fertilizer, herbicide, pesticide, or a moisture retention agent.

5. The retaining wall block of claim 2 wherein the seed carrier is positioned in proximity to the vertical or inclined front face of the gusseted fabric container.

6. The retaining wall block of claim 2 wherein the seed carrier comprises
    a support layer having a top surface and a bottom surface; and
    a seed layer comprising a plurality of plant seeds positioned on and adhered to the top surface of the support layer.

7. The retaining wall block of claim 6 wherein the support layer is a polyvinyl alcohol support film.

8. The retaining wall block of claim 7 wherein the porous fabric is a woven or knitted monofilament fabric.

9. The retaining wall block of claim 6 wherein the support layer is a biodegradable organic mat of wood fiber or cellulose fiber.

10. The retaining wall block of claim 6 further comprising a polyvinyl alcohol cover film positioned over and adhered to the seed layer.

11. The retaining wall block of claim 1 wherein
    the porous fabric has an open surface area in the range of 20 to 50 percent.

12. The retaining wall block of claim 1 wherein the folded back face closure further comprises
    a folded left side flap;
    a folded right side flap with right side flap extension;
    a folded top face flap; and
    a folded bottom face flap.

13. The retaining wall block of claim 12 wherein
    the folded top face flap further comprises an outwardly facing hook and loop fastener section; and
    the folded bottom face flap further comprises an inwardly facing hook and loop fastener section attached to the outwardly facing hook and loop fastener section of the top face flap.

14. The retaining wall block of claim 13 wherein
    the folded left side flap further comprises an outwardly facing hook and loop fastener section; and
    the folded right side flap with right side flap extension further comprises an inwardly facing hook and loop fastener section attached to the outwardly facing hook and loop fastener section of the left side flap.

15. The retaining wall block of claim 1 wherein
    the growth medium further comprises a superabsorbent polymer.

16. The retaining wall block of claim 15 wherein
    the growth medium further comprises an expanded mineral material.

17. The retaining wall block of claim 16 wherein the expanded mineral material further comprises shale, clay, perlite or vermiculite.

18. The retaining wall block of claim 15 wherein the growth medium comprises
    50 percent to 75 percent by volume mineral based soil with a minimum of 5 percent organic matter;
    20 percent to 30 percent by volume expanded mineral material for enhanced drainage, air space, moisture retention and weight reduction; and
    2 percent to 5 percent by volume superabsorbent polymers, for moisture and nutrient retention and release, creating an environment that fosters healthy plant growth and rapid root growth and penetration through adjacent blocks and soil zones.

19. The retaining wall block of claim 15 wherein
    the superabsorbent polymer is provided in a range of 2 percent to 5 percent by volume.

20. A method of constructing a vegetated retaining wall at a job site, the method comprising providing a plurality of retaining wall blocks, configured to be vegetated, each block comprising a gusseted fabric container comprising a porous fabric having at least a 20 percent open surface area, the gusseted fabric container having an unfilled orientation, and a filled orientation in the shape of a rectangular prism comprising a vertical or inclined front face, a left side face, a right side face, a top face, a bottom face, and a back comprising a folded back face closure, wherein the gusseted fabric container is filled from the back with a growth medium; and a plant growth promotion structure comprising a media retention sleeve comprising a three-dimensional open structure matrix material, such that the media retention sleeve is external to the gusseted fabric container and configured to accept and retain a hydromulch material; filling the plurality of retaining wall blocks with a growth medium; laying a first row of retaining wall blocks, so that portions of the media retention sleeves of the first row of retaining wall blocks are upwardly facing; stacking a second row of retaining wall blocks on the first row of retaining wall blocks so that portions of the media retention sleeves of the second row of retaining wall blocks are downwardly facing and engage upwardly facing portions of the media retention sleeves of the first row of retaining wall blocks, and thereby increase friction between the first row of retaining wall blocks and the second row of retaining wall blocks; hydromulching exposed front faces of the first row of retaining wall blocks and the second row of retaining wall blocks; growing plant roots from the hydromulched vertical or inclined front faces into the first row of retaining wall blocks and the second row of retaining wall blocks and into soil adjacent the plurality of retaining wall blocks.

21. The method of constructing a vegetated retaining wall of claim 20 wherein filling the plurality of retaining wall blocks with a growth medium further comprises adding a superabsorbent polymer to the growth medium.

22. The method of constructing a vegetated retaining wall of claim 20 wherein filling the plurality of retaining wall blocks with a growth medium further comprises filling the plurality of porous fabric retaining wall blocks with the soil mixture at the job site.

23. The method of constructing a vegetated retaining wall of claim 20 wherein filling the plurality of retaining wall blocks with a growth medium further comprises filling the plurality of porous fabric retaining wall blocks with the soil mixture at a site remote from the job site and shipping the pre-filled blocks to the job site.

24. The method of constructing a vegetated retaining wall of claim 20 wherein filling the plurality of retaining wall blocks with a growth medium further comprises providing a steel rod structure filling frame comprising a base, angled side walls, and a top frame; inserting the vertical or inclined front face of gusseted fabric container through the top frame of the steel rod structure filling frame and draping the porous fabric of the gusseted fabric container over the top frame; adding growth medium to the gusseted fabric container; and closing the back of the gusseted fabric container.

25. The method of constructing a vegetated retaining wall of claim 20 further comprising providing a plurality of retaining wall blocks, each block further comprising a seed carrier positioned in proximity to the vertical or inclined front face, the seed carrier being water soluble and comprising a support layer, and a seed layer comprising a plurality of plant seeds positioned on and adhered to the support layer, and a cover film positioned over and adhered to the seed layer;

filling the plurality of retaining wall blocks with a growth medium;

laying a first row of retaining wall blocks;

stacking a second row of retaining wall blocks on the first row of retaining wall blocks;

wetting exposed faces of blocks, thus dissolving the water soluble seed carrier such that seeds contact the growth medium within the blocks to initiate germination of the seeds, growing plants from the dissolved seed carriers through the vertical or inclined front fabric faces of the first row of retaining wall blocks and the second row of retaining wall blocks; and growing plant roots through the bottom faces of the second row of retaining wall blocks into the top faces of the first row of retaining wall blocks, thereby securing the second row of retaining blocks to the first row of retaining blocks.

26. The method of constructing a vegetated retaining wall of claim 25 wherein the support layer is a polyvinyl alcohol film.

27. The method of constructing a vegetated retaining wall of claim 25 further comprises providing a soil amendment on the support layer, the soil amendment consisting of at least one of: a plurality of fertilizing agent particles, a plurality of moisture retention particles, and a plurality of herbicide or pesticide particles.

28. The method of constructing a vegetated retaining wall of claim 25 wherein filling the plurality of retaining wall blocks with a growth medium further comprises filling the plurality of porous fabric retaining wall blocks with the soil mixture at the job site.

29. The method of constructing a vegetated retaining wall of claim 25 wherein filling the plurality of retaining wall blocks with a growth medium further comprises filling the plurality of porous fabric retaining wall blocks with the soil mixture at a site remote from the job site.

30. The method of constructing a vegetated retaining wall of claim 25 further comprising pre-growing plants from the seed carriers through the exposed vertical or inclined front faces of the first row of retaining wall blocks and the second row of retaining wall blocks before laying a first row of retaining wall blocks, thereby providing rootzones to quickly grow through blocks and adjacent soil zones to create a contiguously secured structure.

31. The method of constructing a vegetated retaining wall of claim 25 wherein filling the plurality of retaining wall blocks with a growth medium further comprises providing a steel rod structure filling frame comprising
a base,
angled side walls, and
a top frame;

inserting the vertical or inclined front face of gusseted fabric container through the top frame of the steel rod structure filling frame and draping the porous fabric of the gusseted fabric container over the top frame; adding growth medium to the gusseted fabric container; and closing the back of the gusseted fabric container.

\* \* \* \* \*